United States Patent
Terada et al.

[11] Patent Number: 6,122,031
[45] Date of Patent: *Sep. 19, 2000

[54] LIQUID CRYSTAL DEVICE AND LIQUID CRYSTAL APPARATUS INCLUDING SAME

[75] Inventors: Masahiro Terada, Hadano; Yutaka Inaba, Hino; Kazunori Katakura, Atsugi; Yasufumi Asao, Isehara, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/798,335

[22] Filed: Feb. 10, 1997

[30] Foreign Application Priority Data

Feb. 9, 1996 [JP] Japan ................... 8-024064

[51] Int. Cl.$^7$ ................ G02F 1/141; G02F 1/1339
[52] U.S. Cl. ................................. 349/155; 349/133
[58] Field of Search .................... 349/133, 132, 349/123, 155, 135, 163, 171, 172, 158

[56] References Cited

U.S. PATENT DOCUMENTS

| | | | |
|---|---|---|---|
| 4,655,561 | 4/1987 | Kanbe et al. | 350/350 S |
| 4,681,404 | 7/1987 | Okada et al. | 349/173 |
| 4,932,757 | 6/1990 | Hanyu et al. | 350/339 R |
| 5,092,665 | 3/1992 | Kanbe et al. | 359/56 |
| 5,093,737 | 3/1992 | Kanbe et al. | 359/56 |
| 5,099,344 | 3/1992 | Tsuboyama et al. | 359/79 |
| 5,165,076 | 11/1992 | Tsuboyama et al. | 359/75 |
| 5,204,766 | 4/1993 | Taniguchi et al. | 359/81 |
| 5,269,964 | 12/1993 | Yamashita et al. | 349/133 |
| 5,296,953 | 3/1994 | Kanbe et al. | 359/56 |
| 5,381,254 | 1/1995 | Kanbe et al. | 359/54 |
| 5,418,634 | 5/1995 | Kanbe et al. | 359/56 |
| 5,426,525 | 6/1995 | Hanyu et al. | 359/76 |
| 5,436,743 | 7/1995 | Kanbe et al. | 349/56 |
| 5,448,383 | 9/1995 | Kanbe et al. | 359/56 |
| 5,460,749 | 10/1995 | Terada et al. | 252/299.61 |
| 5,465,169 | 11/1995 | Eguchi | 359/74 |
| 5,541,752 | 7/1996 | Taniguchi et al. | 359/78 |
| 5,543,949 | 8/1996 | Machida et al. | 349/123 |
| 5,548,303 | 8/1996 | Kanbe et al. | 345/95 |
| 5,559,616 | 9/1996 | Kanbe et al. | 359/56 |
| 5,565,884 | 10/1996 | Kanbe et al. | 345/97 |
| 5,592,192 | 1/1997 | Kanbe et al. | 345/97 |
| 5,621,427 | 4/1997 | Kanbe et al. | 345/96 |
| 5,633,652 | 5/1997 | Kanbe et al. | 345/97 |
| 5,686,019 | 11/1997 | Nakamura | 349/133 |

FOREIGN PATENT DOCUMENTS

| | | |
|---|---|---|
| 234429 | 9/1987 | European Pat. Off. . |
| 289415 | 11/1988 | European Pat. Off. . |
| 294852 | 12/1988 | European Pat. Off. . |
| 420340 | 4/1991 | European Pat. Off. . |
| 59-193426 | 11/1984 | Japan . |
| 59-193427 | 11/1984 | Japan . |
| 60-156046 | 8/1985 | Japan . |
| 60-156047 | 8/1985 | Japan . |
| 04272982 | 9/1992 | Japan . |
| 5-341295 | 12/1993 | Japan . |
| 6-160869 | 6/1994 | Japan . |
| 86 04060 | 7/1986 | WIPO . |
| 93 22396 | 11/1993 | WIPO . |

*Primary Examiner*—William L. Sikes
*Assistant Examiner*—Dung Nguyen
*Attorney, Agent, or Firm*—Fitzpatrick, Cella, Harper & Scinto

[57] ABSTRACT

A liquid crystal device is constituted by a pair of oppositely disposed substrates each provided with an alignment control layer, and a liquid crystal layer comprising a liquid crystal material and disposed between the substrates with a spacer member. In the device, the spacer member has an electrical conductivity larger than that of the liquid crystal material. Further, the liquid crystal layer containing the spacer member has a first resistance in a direction of a normal to the substrates in a prescribed temperature range substantially lower than a second resistance of a corresponding liquid crystal layer, in the identical direction, consisting only of the liquid crystal material and having the identical plane area and thickness. The liquid crystal device is effective in providing an improved drive margin in a wide temperature range while suppressing a DC offset voltage component applied to the liquid crystal layer.

73 Claims, 10 Drawing Sheets

LIQUID CRYSTAL DEVICE AND LIQUID CRYSTAL APPARATUS INCLUDING SAME

FIELD OF THE INVENTION AND RELATED ART

The present invention relates to a liquid crystal device for use in light-valves for flat-panel displays, projection displays, printers, etc. The present invention also relates to a liquid crystal apparatus, particularly a liquid crystal display apparatus, using the liquid crystal device.

As a type of a liquid crystal device widely used heretofore, there has been known a liquid crystal device, including a type using a twisted nematic (TN) liquid crystal as disclosed by M. Schadt and W. Helfrich, "Applied Physics Letters", Vol. 18, No. 4 (Feb. 15, 1971), pp. 127–128.

Further, there have been also known liquid crystal devices of a simple matrix-type and an active matrix-type as a representative matrix-type liquid crystal device. Of these, the active matrix-type liquid crystal device allows a high contrast and motion picture (dynamic image) display, thus being going to become a mainstream element for liquid crystal displays. Specifically, the active matrix-type liquid crystal device is equipped with a thin film transistor (TFT) at each pixel and independently supplied with a voltage to each pixel, so that the device is very advantageous to device performances, such as contrast and response speed. However, such an active matrix-type liquid crystal device has still left a problem with respect to a production process such that the production of a liquid crystal device free from a defective pixel becomes increasingly difficult as the device area size is larger and, even if it is possible, a tremendous production cost can accrue.

On the other hand, the simple matrix-type liquid crystal device can readily be produced and has a superiority in terms of a production cost. Such a simple matrix-type liquid crystal device includes one of an effective (voltage) value driving (addressing)-type represented by a super twisted nematic (STN) liquid crystal device and one of a pulse driving (addressing)-type using a memory characteristic represented by those using a surface-stabilized ferroelectric liquid crystal (SSFLC) (as described in, Japanese Laid-Open Patent Application (JP-A) 56-107216 corr. to U.S. Pat. No. 4,367,924) and an antiferroelectric liquid crystal. Further, in recent years, there has been proposed a bistable twisted nematic liquid crystal device utilizing a volatile memory state applicable to a simple matrix-type liquid crystal device of a pulse addressing-type. Incidentally, an STN liquid crystal device of an active addressing-type using a high-speed responsive nematic liquid crystal which has recently been studied extensively may be regarded as an intermediate liquid crystal device between those of the effective value driving-type an the pulse driving-type.

When the above-mentioned liquid crystal devices are driven, it is necessary to ensure a drive (voltage) margin allowing a good operation (action) of liquid crystal molecules in a wide temperature range. Particularly, in the case of a liquid crystal device using a chiral smectic liquid crystal exhibiting ferroelectricity, a reverse (delocalized) electric field is liable to be generated due to a spontaneous polarization intrinsic to such liquid crystal molecules, thus resulting in a lowering in a drive margin. For this reason, it is important for the liquid crystal device to take some countermeasure thereagainst.

Further, on the drive of the liquid crystal devices as described above, a ca. 0.1–1% offset voltage as a direct-current (DC) component of a generated voltage is superposed onto a drive voltage waveform depending on a voltage source used, in some cases. By the superposition of the offset voltage, it becomes impossible to apply a desired drive voltage to the liquid crystal device, thus leading to an irregularity in display characteristics and a difference in display quality between panels. Particularly, in an STN mode utilizing an abruptly changing voltage-transmittance characteristic, a slight change in a drive voltage largely affects resultant optical characteristics, thus being required to design such a cell structure that a resultant liquid crystal device is not adversely affected by the offset voltage of a source (power-supply) voltage as less as possible.

Further, the pulse driving simple matrix-type liquid crystal device using an SSFLC described above is readily affected by the offset voltage of a source voltage. The device of this type effects ON-OFF control depending on a pulse area determined by a product of a peak (crest) value and a pulse width (pulse duration) of an applied voltage waveform. Accordingly, even if a pulse voltage is externally applied to the device so as to provide a prescribed pulse area, the device is always continuously supplied with a DC offset voltage (DC component voltage) externally, thus failing to effect a desired ON-OFF control.

As described above, in order to attain designed drive characteristics, a liquid crystal device is required to design its cell structure so as to cut off or minimize the DC offset voltage of a source voltage applied to a liquid crystal layer. Generally, the liquid crystal device has a cell structure such that a liquid crystal layer is sandwiched between a pair of electrode substrates each provided with an alignment control layer. The cell structure including the respective layers (structural members) can be expressed as an equivalent circuit represented by a parallel circuit. Accordingly, in case where an externally applied voltage is in the form of a single pulse, a value of a voltage effectively applied to the liquid crystal layer may be determined based on a ratio between (electric) capacitances of the respective layers in (reverse) proportion thereto. More specifically, in order to increase an effective voltage applied to the liquid crystal layer, a capacitance of the alignment control layer may be set to a value sufficiently larger than that of the liquid crystal layer. On the other hand in the case of a DC-like voltage always externally applied to the liquid crystal layer, an effective voltage value applied to the liquid crystal layer may be determined based on a resistance (electrical resistance) ratio of the respective layers. Accordingly, in this instance, the effective voltage value exerted on the liquid crystal layer may be set so as to be lower than the DC-like voltage in order to alleviate the influence of the DC offset voltage. For this purpose, a resistance of the alignment control layer may be set to a value sufficiently larger than that of the liquid crystal layer. As a result, the cell structure may be designed to provide the alignment control layer with a capacitance value and a resistance value sufficiently larger than those of the liquid crystal layer, respectively.

However, if the thickness of the alignment control layer is made small in order to increase a capacitance thereof, the resistance of the alignment control layer becomes low and, on the other hand, if the thickness is made larger in order to increase a resistance, the capacitance becomes small, thus resulting in a trade-off relationship between the resistance and the capacitance. Accordingly, it has been difficult to fulfill both the above requirements at the same time by only a control of the alignment control layer.

In view of the above-mentioned circumstances, it is found that an appropriate lowering of a resistance of the liquid crystal layer while keeping a balance with (electrical) characteristics of the alignment control layer. As a method for that purpose, a method wherein impurity ions are added to a liquid crystal material per se to lower a resistance may be adopted. However, this method is accompanied with a problem such that a drive characteristic of a resultant liquid crystal device can be changed and an unexpected burning phenomenon may occur.

SUMMARY OF THE INVENTION

In view of the above-mentioned problems, an object of the present invention is to provide a liquid crystal device having excellent switching characteristics and a cell structure capable of ensuring a large drive margin in a wide temperature range particularly at low temperatures and removing an unnecessary DC voltage component applied to a liquid crystal layer.

Another object of the present invention is to provide a liquid crystal apparatus equipped with the liquid crystal device.

According to a first aspect of the present invention, there is provide a liquid crystal device, comprising: a pair of oppositely disposed substrates each provided with an alignment control layer, and a liquid crystal layer comprising a liquid crystal material and disposed between the substrates with a spacer member, wherein the spacer member has an electrical conductivity larger than that of the liquid crystal material, and the liquid crystal layer containing the spacer member has a first resistance in a direction of a normal to the substrates in a prescribed temperature range substantially lower than a second resistance of a corresponding liquid crystal layer, in the identical direction, consisting only of the liquid crystal material and having the identical plane area and thickness.

In the first aspect of the present invention, the first resistance may preferably be at most $1/10$ of the second resistance in a prescribed temperature range, preferably at least including 0–60° C.

According to a second aspect of the present invention, there is provided a liquid crystal device, comprising: a pair of oppositely disposed substrates at least one of which is provided with a dielectric layer, and a liquid crystal layer comprising a liquid crystal material and disposed between the substrates with a spacer member, wherein the spacer member has an electrical conductivity larger than that of the liquid crystal material, and the liquid crystal layer containing the spacer member has a third resistance per unit area in a direction of a normal to the substrates in a prescribed temperature range substantially lower than a fourth resistance per unit area of the dielectric layer provided to at least one of the substrates.

In the second aspect of the present invention, the third resistance may preferably be at most $1/10$ of the fourth resistance in a prescribed temperature range, preferably at least including 0–60° C.

In a particularly preferred embodiments according to the first and second aspects of the present invention; the liquid crystal layer containing the spacer member has a first resistance in a direction of a normal to the substrates in a prescribed temperature range substantially lower than a second resistance of a corresponding liquid crystal layer, in the identical direction, consisting only of the liquid crystal material and having the identical plane area and thickness; and the liquid crystal layer containing the spacer member has a third resistance per unit area in a direction of a normal to the substrates in a prescribed temperature range substantially lower than a fourth resistance per unit area of the dielectric layer provided to at least one of the substrates.

According to a third aspect of the present invention, there is provided a liquid crystal device, comprising: a pair of oppositely disposed substrates provided with a first dielectric layer and a second dielectric layer, respectively, and a liquid crystal layer comprising a liquid crystal material and disposed between the substrates with a spacer member, wherein the spacer member has an electrical conductivity larger than that of the liquid crystal material and comprises plural spacing constituents disposed at an average distance L from each other, and at least one of the following conditions 1 and 2 is satisfied in a prescribed temperature range:

(Condition 1) $R_{LC} < R_{V1}$ and $R_{H1} < R_{V1}$, (Condition 2) $R_{LC} < R_{V2}$ and $R_{H2} < R_{V2}$, wherein $R_{LC}$ represents a resistance per an area L×L of the liquid crystal layer containing the spacer member in a direction of a normal to the substrates; $R_{V1}$ represents a resistance per an area L×L of the first dielectric layer in the normal direction; $R_{H1}$ represents a sheet resistance of the first dielectric layer in a horizontal direction to the substrates; $R_{V2}$ represents a resistance per an area L×L of the second dielectric layer in the normal direction; and $R_{H2}$ represents a sheet resistance of the second dielectric layer in the horizontal direction.

In the third aspect of the present invention, the prescribed temperature range may desirably be 0–60° C. Further, the resistance $R_{LC}$, $R_{V1}$, $R_{H1}$, $R_{V2}$ and $R_{H2}$ may preferably satisfy at least one of the following conditions 1a and 2a in a prescribed temperature range, particularly at least including 0–60° C.:

(Condition 1a) $10 \times R_{LC} < R_{V1}$ and $R_{H1} < R_{V1}$, (Condition 2a) $10 \times R_{LC} < R_{V2}$ and $R_{H2} < R_{V2}$.

According to a fourth aspect of the present invention, there is provided a liquid crystal device (substantially corresponding to a modified embodiment of the device of the third aspect of the invention), comprising: a pair of oppositely disposed substrates each provided with an alignment control layer and a liquid crystal layer comprising a liquid crystal material and disposed between the substrates with a spacer member, at least one of the substrates being provided with an electrode, a passivation layer and the alignment control layer disposed thereon in this order, wherein the spacer member has an electrical conductivity larger than that of the liquid crystal material and comprises plural spacing constituents disposed at an average distance L from each other, and the following condition 3 is satisfied in a prescribed temperature range:

(Condition 3) $R_{LC} < R_{V3}$ and $R_{H3} < R_{V3}$, wherein $R_{LC}$ represents a resistance per an area L×L of the liquid crystal layer containing the spacer member in a direction of a normal to the substrates; $R_{V3}$ represents a resistance per an area L×L of the alignment control layer and the passivation layer as a whole in the normal direction; $R_{H3}$ represents a sheet resistance of the alignment control layer and the passivation layer as a whole in a horizontal direction to the substrate.

In the fourth aspect of the invention, the prescribed temperature range may desirably be 0–60° C.

Further, the resistance $R_{LC}$, $R_{V3}$, and $R_{H3}$ may more preferably satisfy the following condition 3a in a prescribed temperature range, particularly at least including 0–60° C.:

(Condition 3a) $10 \times R_{LC} < RV_3$ and $R_{H3} < R_{V3}$.

According to a fifth aspect of the invention, there is provided a liquid crystal device, comprising: a pair of oppositely disposed substrates provided with at least a first dielectric layer and a second dielectric layer, respectively, and a liquid crystal layer comprising a liquid crystal material and disposed between the substrates with a spacer member, wherein the spacer member has an electrical conductivity larger than that of the liquid crystal material and comprises plural spacing constituents disposed at an average distance L from each other, and at least one of the following conditions 4 and 5 is satisfied in a prescribed temperature range:

(Condition 4) $R_{LC} < R_{V1}$, $R_{H1} < R_{V1}$, and $C \times R_{H1} \leq T$ (T=1 sec), (Condition 5) $R_{LC} < R_{V2}$, $R_{H2} < R_{V2}$, and $C \times R_{H2} \leq T$ (T=1 sec), wherein $R_{LC}$ represents a resistance per an area L×L of the liquid crystal layer containing the spacer member in a direction of a normal to the substrates; $R_{V1}$ represents a resistance per an area L×L of the first dielectric layer in the normal direction; $R_{H1}$ represents a sheet resistance of the first dielectric layer in a horizontal direction to the substrates; $R_{V2}$ represents a resistance per an area L×L of the second dielectric layer in the normal direction; $R_{H2}$ represents a sheet resistance of the second dielectric layer in the horizontal direction; and C represents a total capacitance per an area L×L of the first and second dielectric layers.

In the fifth aspect of the invention, the prescribed temperature range may preferably be 0–60° C.

Further, the resistance $R_{LC}$, $R_{V1}$, $R_{H1}$, $R_{V2}$ and $R_{H2}$ and the capacitance C may more preferably satisfy at least one of the following conditions 4a and 5a in a prescribed temperature range:

(Condition 4a) $10 \times R_{LC} < R_{V1}$, $R_{H1} < R_{V1}$, and $C \times R_{H1} \leq T$ (T=1 sec), (Condition 5a) $10 \times R_{LC} < R_{V2}$, $R_{H2} < R_{V2}$, and $C \times R_{H2} \leq T$ (T=1 sec).

According to a sixth aspect of the invention, there is provided a liquid crystal device (substantially corresponding to a modified embodiment of the device of the fifth aspect of the invention), comprising: a pair of oppositely disposed substrates each provided with an alignment control layer and a liquid crystal layer comprising a liquid crystal material and disposed between the substrates with a spacer member, at least one of the substrates being provided with an electrode, a passivation layer and the alignment control layer disposed thereon in this order, wherein the spacer member has an electrical conductivity larger than that of the liquid crystal material and comprises plural spacing constituents disposed at an average distance L from each other, and the following condition 6 is satisfied in a prescribed temperature range:

(Condition 6) $R_{LC} < R_{V3}$, $R_{H3} < R_{V3}$, and $C \times R_{H3} \leq T$ (T=1 sec), wherein $R_{LC}$ represents a resistance per an area L×L of the liquid crystal layer containing the spacer member in a direction of a normal to the substrates; $R_{V3}$ represents a resistance per an area L×L of the alignment control layer and the passivation layer as a whole in the normal direction; $R_{H3}$ represents a sheet resistance of the alignment control layer and the passivation layer as a whole in a horizontal direction to the substrates; and C represents a total capacitance per an area L×L of the alignment control layer and the passivation layer as a whole.

In the sixth aspect of the invention, the prescribed temperature range may desirably be 0–60° C.

Further, the resistance $R_{LC}$, $R_{V3}$, and $R_{H3}$ and the capacitance C may more preferably satisfy the following condition 6a in a prescribed temperature range, particularly at least including 0–60° C.:

(Condition 6a) $10 \times R_{LC} < RV_3$, $R_{H3} < R_{V3}$, and $C \times RH_3 \leq T$ (T=1 sec).

The present invention further provides liquid crystal apparatus including one of the above-mentioned liquid crystal devices of the first to sixth aspects and a drive means for driving the device.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

The liquid crystal devices according to the first to sixth aspects of the present invention may be applicable to any optical modulation-type liquid crystal device, preferably be used as a light shutter or a light valve. Further, in the liquid crystal device of the present invention, both a multiplex-addressing scheme using an electrode matrix and a light-addressing scheme may be adopted as a pixel-addressing scheme. More specifically, the liquid crystal device of the present invention may be one using a nematic liquid crystal, particularly preferably a chiral smectic liquid crystal device.

Hereinbelow, the liquid crystal device of the present invention will be specifically with reference to the drawings.

Figure 1:
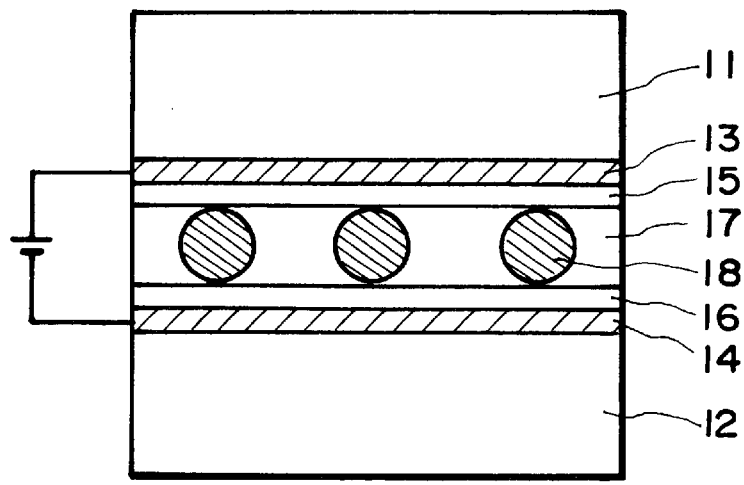
FIG. 1 is a schematic sectional view of an embodiment of a liquid crystal device according to the present invention wherein a DC voltage is applied between electrodes of a pair of substrates.

FIG. 1 is a schematic sectional view of an embodiment of a liquid crystal device of the present invention for illustrating a state wherein a DC (direct-current) voltage is applied between two electrodes of a pair of substrates.

Referring to FIG. 1, the device has a cell structure wherein a pair of oppositely disposed (parallel) substrates 11 and 12 are coated with electrodes 13 and 14, respectively, and further coated with alignment control layers 15 and 16 each consisting of a dielectric material, respectively. Between the pair of substrates 11 and 12, a liquid crystal layer 17 is disposed with a spacer member 18 comprising plural spacer beads (particles).

At first, a steady-state potential distribution in the liquid crystal layer in this embodiment at the time of a DC voltage application between the electrode 13 provided with a position electrode potential and the electrode 14 provided with a negative electrode potential.

In order to sufficiently reducing a DC voltage component exerted on the liquid crystal layer 17 when compared with the applied voltage exerted between the electrodes 13 and 14, it is necessary to provide a larger fractional (divided) voltage (of the DC voltage component) applied to a dielectric layer (e.g., the alignment control layer 15 or 16) than that applied to the liquid crystal layer 17. The respective fractional voltages of the DC voltage component applied to the respective layers may be determined based on a ratio of respective resistances of the associated layers.

According to the first aspect of the present invention, a substantially electroconductive material showing a suitable electrical-conductivity larger than that of a liquid crystal material constituting the liquid crystal layer is used as a material for the spacer member. Further, the liquid crystal layer containing the spacer member provides a resistance (electrical resistance) in a direction of a normal to the parallel substrates (or a cell thickness direction) (hereinafter, referred to as "normal (or vertical) direction") substantially lower than a resistance in the identical (normal) direction of a corresponding liquid crystal layer consisting only of the liquid crystal material and having the identical plane area and thickness. The latter resistance is intrinsic to the liquid crystal material per se.

Herein, the expression "substantially lower" with respect to the resistance means that a resistance of a liquid crystal layer containing a larger electrical-conductivity spacer member (spacer beads) dispersed therein is lower to such an extent that the above layer exhibits substantially different electrical characteristic, preferably a resistance being at most ca. 1/10, compared with those that of the corresponding liquid crystal layer identical to the above layer (containing the spacer member) except for omitting the spacer member.

The sufficiently lowered resistance of the liquid crystal layer containing the spacer member as described above is effective in preventing or alleviating a lowering in a drive margin, particularly at low temperatures, resulting from a reverse electric field generated within a cell due to a spontaneous polarization of liquid crystal molecules, particularly in the case of a liquid crystal device using a chiral smectic liquid crystal having ferroelectricity consisting of liquid crystal molecules exhibiting a spontaneous polarization.

According to the second aspect of the prevent invention, when $r_v$ represents a resistance per unit area of the dielectric layer (e.g., alignment control layer) in the normal (vertical) direction and $r_{LC}$ represents a resistance per unit area of the liquid crystal layer containing the spacer member in the normal direction, the relationship: $r_v > r_{LC}$, preferably $r_v > 10 \times r_{LC}$, is fulfilled to enhance the above effect.

As will be described hereinafter, e.g., by appropriately selecting a resistance ratio of the dielectric layer between in the normal (vertical direction and the horizontal (parallel) direction to the substrates, a voltage can be uniformly applied to the liquid crystal layer irrespective of a dispersibility of the spacer beads (spacing constituents) as the spacer member. Accordingly, in the above-described conditions (relationships), the resistance of the liquid crystal layer containing the spacer member corresponds to an integral or composite single layer consisting of the liquid crystal material and the spacer member.

The above described resistance conditions may be satisfied in an operational temperature range, preferable in a temperature range of 0–60° C.

The potential distribution within the liquid crystal layer will be described with reference to FIGS. 2A and 2B.

For simplicity, the case of using a liquid crystal cell including a pair of substrates only one of which is provided with a dielectric layer will be considered.

Figure 2A:
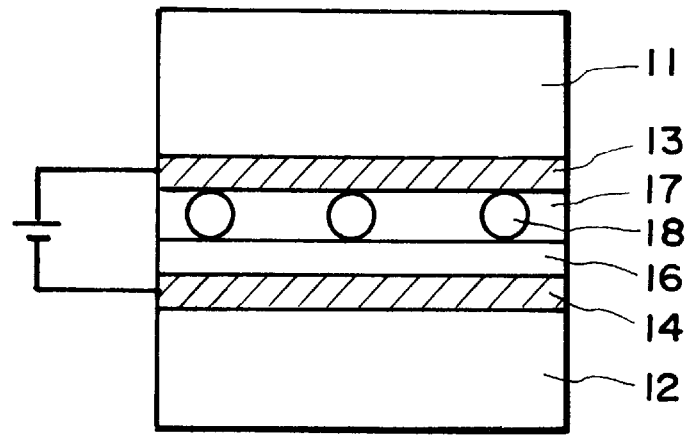
FIG. 2A is a schematic sectional view of another embodiment of a liquid crystal device using one dielectric layer of the invention wherein a DC voltage is applied between electrodes.
Figure 2B:
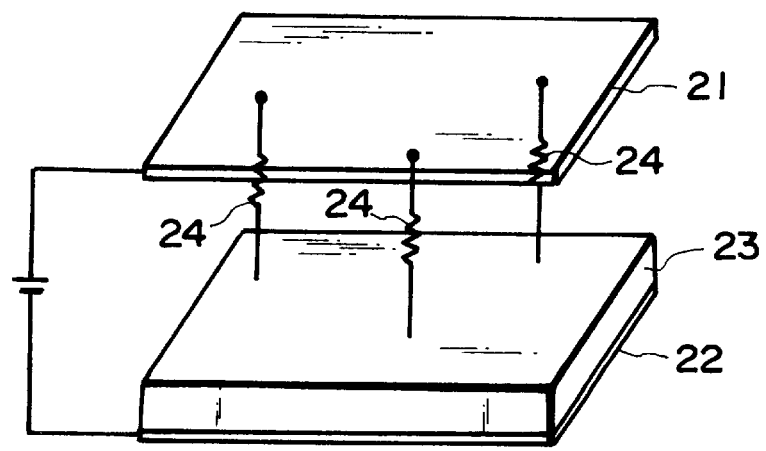
FIG. 2B shows an equivalent circuit for the device shown in FIG. 2A.

FIG. 2A shows a schematic sectional view of such a liquid crystal cell including a pair of oppositely disposed substrates 11 and 12 respectively having thereon electrodes 13 and 14, a dielectric layer 16 formed on the electrode 14, a liquid crystal layer 17 disposed between the substrates 11 and 12 (exactly between the electrode 13 and the dielectric layer 16) with a spacing member (spacer beads) 18. FIG. 2B is an equivalent circuit of the cell shown in FIG. 2A, wherein conductive members 21 and 22 correspond to the electrode (13 and 14), a resistance member 23 corresponds to the dielectric layer 16, and reference numerals 24 represent resistances of the spacer member 18 at corresponding portions. In the present invention, the resistance of the spacer member is sufficiently lower than that of the liquid crystal layer, thus disregarding the influence of a current passing through the liquid crystal layer.

In this embodiment, a current supplied from the upper substrate 11 toward the lower substrate 12 though the spacer member 18 flows through the dielectric layer 16 in the vertical direction toward the electrode 14 while extending in the horizontal direction within the dielectric layer 16. At this time, if the electroconductivity of the dielectric layer 16 in the horizontal direction is larger than that in the vertical direction, the extension region of the current becomes larger.

As a result, the surface potential of the dielectric layer 16 is increased in a wider region, thus resulting in a decreased voltage component applied to the liquid crystal layer 17 in the region.

Assuming that a distance between adjacent spacer beads (as the spacer member) is sufficiently larger than a length of the current extension region to such an extent that the influence of the spacer beads on each other can be disregarded, a potential distribution V(r) (r: a distance from the position of the spacer member) of the dielectric layer surface due to the above current extension may be obtained in the following manner.

When the dielectric layer 16 has a thickness h, a volume resistivity $\rho_v$ in the vertical (normal) direction, and a sheet resistance $\rho_H$ in the horizontal direction, the following equations (1)–(3) can be fulfilled.

(1) Current density per unit area of the dielectric layer in the vertical direction at the point spaced the distance r away from the spacer member:

$$I_v(r) = V(r)/(h\rho_v)$$

(2) Current density per unit area of the dielectric layer in the horizontal direction at the point spaced the distance r away from the spacer member:

$$I_H(r) = -\{dV(r)/dr\}/\rho_H$$

(3) Relationship between the current densities in the vertical and horizontal directions:

$$dI_H(r)/dr = -I_v(r)$$

From the above equations (1)–(3), the potential distribution V(r) may be determined by the following equation:

$$V(r) = V(0)\exp\left\{-r/\sqrt{(h\rho_v/\rho_H)}\right\}.$$

As a result, the potential distribution region can range over a region having a radius $$\sqrt{(h\rho_v/\rho_H)}$$

and a specific position of the spacer member as its center.

If the resistance of the dielectric layer is isotropic, i.e., the volume resistivities thereof in the vertical and horizontal directions are identical to each other ($\rho_H = \rho_v/h$), the resultant potential distribution can range over at most a circular region having a radius h (layer thickness). In this case, at the position spaced away from the spacer member by a distance above the layer thickness h, the surface potential of the dielectric layer is not affected by the current passing through the spacer member, thus being substantially equal to the electrode potential of the lower substrate.

In case where the electroconductivity of the dielectric layer in the horizontal direction is far larger than that in the vertical direction, the resultant potential (voltage) distribution can range over a region having a radius considerably larger than the layer thickness (h). If the radius is larger than an average distance L between adjacent spacer beads, the potential of the dielectric layer surface in almost all the regions becomes substantially identical to that at the point where the spacer member is disposed. As a result, the applied voltage to the liquid crystal layer containing the spacer member is lowered when compared with the case of the liquid crystal layer containing no spacer member.

For this purpose, the following relationship is required.

$$\sqrt{(h\rho_v/\rho_H)} > L \quad \text{(i.e., radius > average distance)}$$

With respect to an area L×L of the dielectric layer, when a sheet resistance in the horizontal direction is represented by $R_H$ and a resistance in the vertical direction is represented by Rv, the resistances $R_H$ and Rv satisfy the following relationship: Rv>$R_H$ because of $R_H = \rho_H$ and Rv=$h\rho_v/L^2$.

As described above, in order to suppressing or minimizing a DC electric field (DC voltage component) exerted on the liquid crystal layer, we have found that the following conditions (A) and (B) are required.

(A) To sufficiently reduce a divided voltage applied to the liquid crystal layer depending on a resistance-divided ratio when compared with that applied to the dielectric layer, i.e., $R_{LC}$<Rv, preferably 10×$R_{LC}$<Rv (wherein $R_{LC}$ represents a resistance (average resistance) per an area L×L of the liquid crystal layer (integrally inclusive of the (conductive) spacer member) in the vertical direction.

(B) To sufficiently decrease a resistance per an area L×L of the dielectric layer in the horizontal direction when compared with that in the vertical direction, i.e., $R_H$<Rv.

In the above, although the explanation is effected based on the assumption that either one of the substrates (lower substrate) is provided with the dielectric layer, the identical result is attained with respect to the other (upper) substrate if only the substrate is provided with the dielectric layer.

In case where both the substrates are provided with dielectric layers, respectively, the above conditions (A) and (B) may preferably be satisfied with respect to the respective dielectric layers formed on the substrates, respectively. However, it is clear that, if at least one of the dielectric layer fulfills the above conditions (A) and (B), the DC voltage application to the liquid crystal layer can effectively be minimized. In case where the respective dielectric layers provide different resistances in the vertical direction, the above conditions (A) and (B) may desirably be satisfied with respect to the dielectric layer providing a larger resistance value (in the vertical direction).

In the present invention, the dielectric layer may include an alignment control layer for controlling an alignment state of liquid crystal molecules and optionally include a passivation layer having a desired function disposed between the electrode and the alignment control layer, as desired. In this case, the respective resistance values for the conditions (A) and (B) described above may be determined based on those (total resistances) with respect to the constituent layer(s) (alignment control layer and/or passivation layer) constituting the dielectric layer. Further, the above conditions (A) and (B) may preferably be fulfilled in an operation-temperature range, particularly in a temperature range at least including 0–60° C.

The chiral smectic liquid crystal showing a ferroelectricity is liable to cause a (reverse) electric field directed in a direction opposite to the direction of its spontaneous polarization due to movable (electric) charges, such as ions, at the time immediately after the switching operation. As a result, there have been known disadvantages due to the reverse electric field, such as inferior switching (or switching failure), after-image and flickering.

In the liquid crystal device of the present invention, the electroconductive spacer member is disposed between the pair of substrates, whereby the above electric charges can be attenuated in an attenuation time. Accordingly, if the attenuation time is sufficiently shortened or reduced, the electric charges do not adversely affect the switching characteristic, thus suppressing the after-image.

Hereinbelow, the attenuation of the electric charges in the case of using the electroconductive spacer member will be specifically described with reference to FIGS. 3, 4A and 4B.

Figure 3:
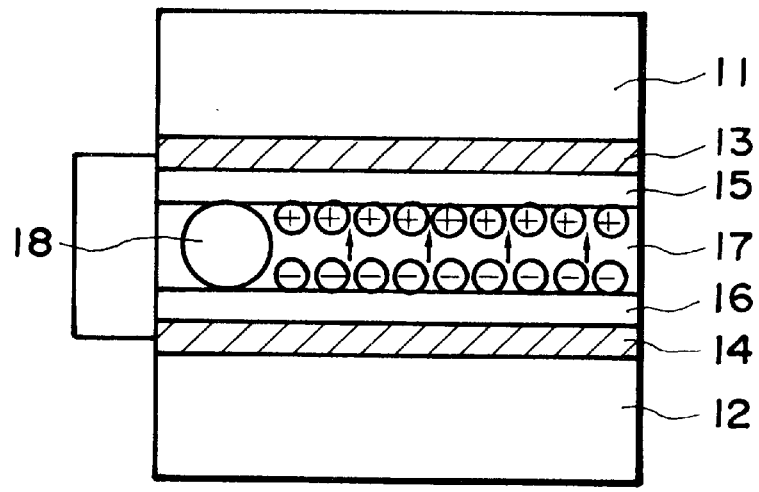
FIG. 3 is a schematic sectional view of another embodiment of a liquid crystal device using a ferroelectric liquid crystal according to the present invention wherein a charge distribution state in a liquid crystal layer is schematically illustrated.

FIG. 3 is a schematic sectional view of a liquid crystal device having a similar cell structure as in the device shown in FIG. 1, wherein identical structural members are indicated by identical reference numerals. The alignment control layers 15 and 16 are used as the dielectric layers in this embodiment.

When the state of the spontaneous polarization of liquid crystal molecules is switched from one in the direction toward the lower dielectric layer 16 to one in the direction toward the upper dielectric layer 15, positive electric charges remain on the surface of the upper dielectric layer 15 and negative electric charges remain on the surface of the lower dielectric layer 16, respectively.

These electric charges are attenuated while passing across the liquid crystal layer and the dielectric layer in the vertical direction in case where the device does not employ the electroconductive spacer member (i.e., employs an ordinary (insulating) spacer member).

On the other hand, in case where the electroconductive spacer member is used in the device and the resistance of the dielectric layer in the horizontal direction is lower than that in the vertical direction, the electric charges move in the vertical direction within the dielectric layer and are neutralized via the electroconductive spacer member.

In this case, an attenuation time constant may be estimated in the following manner.

For simplicity, the case of using a dielectric layer provided to only one of the a pair of substrates will be considered.

Figure 4A:
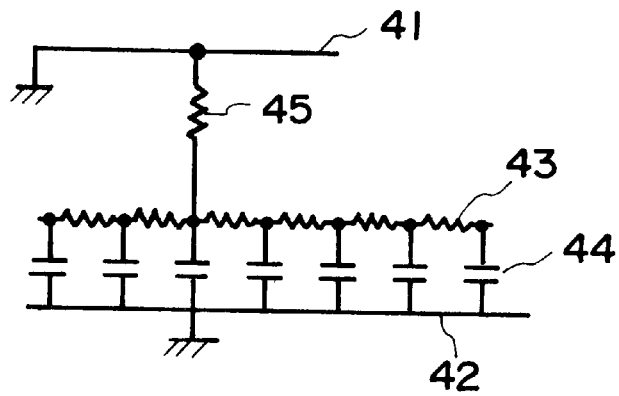
FIG. 4A shows an equivalent circuit of a liquid crystal device of the invention employing one dielectric layer.
Figure 4B:
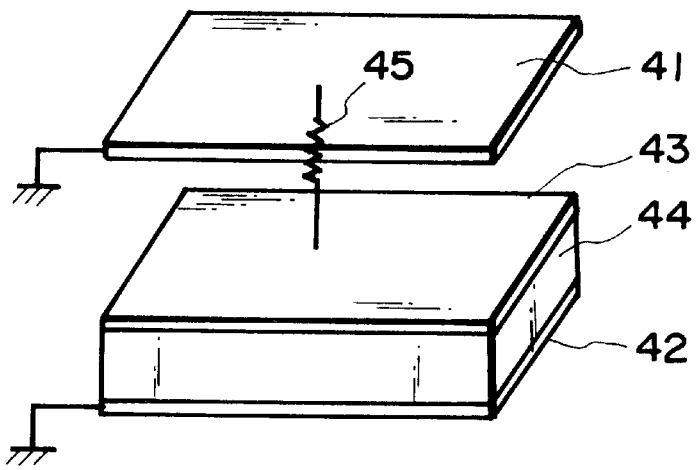
FIG. 4B shows a schematic illustration of the equivalent circuit shown in FIG. 4A.

When both of upper and lower electrodes are grounded, two-type of equivalent circuits in this instance are shown in FIGS. 4A and 4B wherein reference numerals 41 and 42 represent upper and lower electrodes, respectively; a reference numeral 43 represents the surface of a dielectric layer regarded as a resistance member; a reference numeral 44 represents a dielectric layer; and a reference numeral 45 represents a spacer member (spacer beads or particles), regarded as a resistance member, comprising an electroconductive material. In this embodiment, assuming that the influence of spacer beads (particles) on each other can be disregarded by a sufficiently larger distance between adjacent spacer beads (particles), it is possible to consider only the influence of one spacer particle functioning as a resistance member.

In this case, the dielectric layer has a capacitance (electrostatic capacity) $c_H$ per unit area and a sheet resistance $\rho_H$ per unit area in the horizontal direction, and the upper and lower substrates provides a resistance $R_B$ therebetween at the spacer position (resistance of the spacer particle). Further, these resistances are assumed to be sufficiently lower than those of the liquid crystal layer and the dielectric layer in the vertical direction, thus disregarding the electroconductivity of the layers in the vertical direction.

When electric charges are assumed to be uniformly present on the surface of the dielectric layer at a time t (t=0) at a density of q(0), the electric charge attenuation may be considered as follows.

More specifically, from the following equations (i), (ii) and (iii).

(i) Relationship between potential and charge density on the dielectric layer surface:

$$q(r,t)=c_H V(r,t)$$

(ii) Current density on the dielectric layer surface in the horizontal direction:

$$I_H(r,t)=-\{\partial V(r,\partial t)/\partial r\}/\rho_H$$

(iii) Conservation law between current and electric charge:

$$\partial q(r,t)/\partial t = -\partial I_H(r,t)/\partial r,$$

the following equation is derivable:

$$\partial q(r,t)/\partial t=[1/(c_H\rho_H)]\partial^2 q(r,t)/\partial r^2.$$

This equation corresponds to a diffusion equation including a diffusion coefficient: $[1/(c_H\rho_H)]$. Accordingly, electric charges immediately close to the spacer member are diffused through the spacer member at first and then extend to its ambient region.

In case where the resistance $R_B$ of the spacer member is considerably lower than the sheet resistance $\rho_H$ of the dielectric layer, electric charges gathered around the spacer member along the dielectric layer surface are quickly diffused through the spacer member. As a result, an electric potential at a point immediately under the spacer member is fixed to be substantially equal to the upper substrate (electrode) potential. Under this boundary condition, an integral (solution) of the above diffusion equation is well known as follows.

$$q(r,t)=q(0)\exp(-r^2/2Dt)$$

$$D=1/(c_H\rho_H)$$

At a time t, the charge attenuation (diffusion) region ranges over a circular region having a radius about $$\sqrt{[t/\partial(c_H\rho_H)]}.$$

Accordingly, a time (time constant) τ required for attenuating electric charges in the almost entire liquid crystal region may be represented by the following equation:

$$\tau=L^2 c_H\rho_H$$

(L: average distance between adjacent spacer particles).

With respect to a specific area L×L, a capacitance (electrostatic capacity) $C_H$ (F) is represented by the equation: $C_H=c_H\times L^2$ and a sheet resistance $R_H$ (ohm/□) equals to $\rho_H$ (per unit area). Accordingly, the following equation is obtained.

$$\tau=C_H R_H$$

On the other hand, when the resistance $R_B$ is larger than the sheet resistance $\rho_H$, an diffusion speed at which electric charges are gathered around the spacer member along the dielectric layer surface varies depending on a current passing across the spacer member, i.e., depending on the resistance $R_B$, thus obtaining the following equation.

$$\tau=C_H R_B$$

If the resistances $R_B$ and $\rho_H$ are substantially equal to each other, both the resistances equivalently affect the time constant τ, thus resulting in the following equation:

$$\tau=C_H(R_B+\rho_H)$$

The electric charges are required to be attenuated or removed quickly so as not to remarkably impair display image quality since the electric charges lead to after-images. In this regard, we have confirmed that an after-image disappearing time of at most 1 sec. is of no problem for practical use by a practical test. Accordingly, in order to provide a liquid crystal cell causing no after-image, the following condition may be required.

$$C_H(R_B+R_H) \leq 1 \text{ sec.}$$

As described above, in order to quickly attenuate the electric charge though the spacer member, we have found that the following conditions (C) and (D) are required.

(C) To sufficiently decrease a resistance of the dielectric layer in the horizontal direction when compared with those in the vertical direction of the dielectric layer and the liquid crystal layer (consisting only of the liquid crystal material), each per an area L×L, i.e., $R_H < Rv$ and $R_H < R_{LC}'$ ($R_{LC}'$: a resistance per an area L×L of the liquid crystal layer containing no spacer member in the vertical direction).

(D) To provide the attenuation time being at most 1 sec., i.e., $$C_H(R_B+R_H) \leq 1 \text{ sec.}$$

In the case of using a sufficiently high-conductivity spacer member as in the present invention, it is sufficient to fulfill the following relationship:

$$C_H R_H \leq 1 \text{ sec.}$$

In addition to the above conditions (C) and (D), when a device structure is designed to satisfy the condition (A) described above, it is possible to minimize the DC voltage component applied to the liquid crystal layer while quickly attenuating the electric charges leading to after-image.

Incidentally, in case where the liquid crystal device of the present invention is driven in a dot- or line-sequential scanning (driving) scheme for displaying motion picture (dynamic) images, it is particularly preferred that the time constant $\tau$ (=C×R) is at most a time $T_F$ representing one frame-forming period (one horizontal scan period).

In the above, although the explanation is effected based on the assumption that either one of the substrates (lower substrate) is provided with the dielectric layer, the identical result is attained with respect to the other (upper) substrate if only the substrate is provided with the dielectric layer.

Incidentally, herein the "capacitance" of the dielectric layer is determined by a total capacitance of the dielectric layer(s) provided to the pair of substrates.

In case where both the substrates are provided with dielectric layers, respectively, the above conditions (C) and (D) may preferably be satisfied with respect to the respective dielectric layers formed on the substrates, respectively. However, it is clear that, if at least one of the dielectric layer fulfills the above conditions (C) and (D), the electric charges can effectively be attenuated. In case where the respective dielectric layers provide different resistances in the vertical direction, the above conditions (C) and (D) may desirably be satisfied with respect to the dielectric layer providing a larger resistance value (in the vertical direction).

With respect to the conditions (C) and (D), the dielectric layer may include a single layer structure consisting of an alignment control layer and a lamination layer structure comprising the upper alignment control layer and a lower passivation layer on the electrode. In this case, it is possible to enhance the effect of prevention of occurrence of after-image resulting from the reverse electric field by controlling the characteristics (resistances and capacitance) of the alignment control layer and/or the passivation layer as a whole. Further, the above conditions (C) and (D) may preferably be fulfilled in an operation-temperature range, particularly in a temperature range at least including 0–60° C.

Hereinbelow, a representative cell structure of the liquid crystal device of the present invention will be described specifically with reference to FIG. 5.

Figure 5:
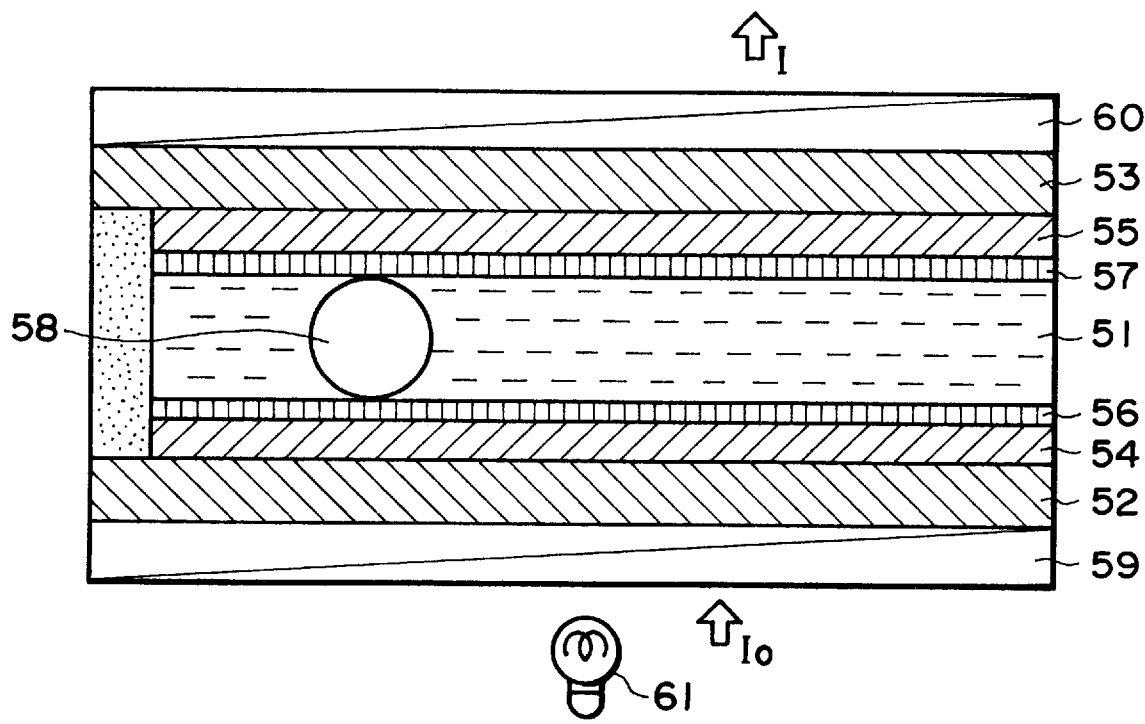
FIG. 5 is a schematic sectional view of another embodiment of a liquid crystal device according to the present invention.

FIG. 5 is a schematic sectional view of an embodiment of the liquid crystal device for explanation of the structure thereof.

Referring to FIG. 5, the liquid crystal device includes a liquid crystal layer 51 comprising a liquid crystal material (e.g., nematic, smectic and chiral smectic liquid crystals) disposed together with a spacer member 58 between a pair of substrates 52 and 53 each having thereon a group of transparent electrodes 54 or 55 for applying a voltage to the liquid crystal layer 51 and an alignment control layer 56 or 57. The periphery of the substrates 52 is sealed up with a sealing agent. Outside the substrates 52, a pair of polarizers 59 and 60 are disposed so as to modulate incident light $I_0$ from a light source 61 in cooperation with the liquid crystal 51 to provide modulated light I.

In the case of using a chiral smectic liquid crystal (composition), the liquid crystal layer 51 may preferably have a thickness (corresponding to a cell gap) of at most 5 μm in order to realize bistability as in the above-described SSFLC-type cell. Each of the substrates 52 and 53 comprise a high transparent material such as glass or plastic and is coated with a transparent electrode 54 or 55 having a prescribed pattern (e.g., stripe pattern) and comprising a transparent electroconductive film of e.g., ITO (indium-tin-oxide) to form an electrode plate. On at least one of the electrode plates, the alignment control layer 56 or 57 affecting an alignment state of the liquid crystal may be formed. Examples of a material for the alignment control layer 56 or 57 may include: an inorganic material, such as silicon monoxide, silicon dioxide, aluminum oxide, zirconium oxide, magnesium fluoride, cerium oxide, cerium fluoride, silicon nitride, silicon carbide, or boron nitride; and an organic material, such as polyvinyl alcohol, polyimide, polyamide-imide, polyester, polyamide, polyester-imide, polyparaxylylene, polycarbonate, polyvinyl acetal, polyvinyl chloride, polystyrene, polysiloxane, cellulose resin, melamine resin, urea resin or acrylic resin. The alignment control layer 56 or 57 formed on at least one of the substrate 52 and 53 may desirably be subjected to a uniaxial aligning treatment (e.g., rubbing treatment).

The uniaxial aligning-treated alignment control layer is, e.g., formed on the substrate (or a prescribed layer formed thereon) by applying a solution containing the above inorganic or organic material or by vapor deposition or sputtering of such materials. The surface of thus prepared alignment control layer 56 or 57 is subjected to a prescribed uniaxial aligning treatment, e.g., by rubbing the surface with a fibrous material such as velvet, cloth or paper. The (uniaxial aligning-treated) alignment control layer 56 or 57 may be formed by an oblique vapor deposition method wherein a film of an oxide such as SiO or an nitride is vapor-deposited on the substrate(s) from an oblique direction to the substrate.

The alignment control layer may preferably have a thickness of at most 200 Å, more preferably 100 Å, in order to improve a switching performance since such a thin alignment control layer is effective in lowering a value of a reverse electric field caused by switching of a spontaneous polarization Ps.

In view of electrical characteristics and an alignment control ability, the alignment control layer (preferably subjected to a uniaxial aligning treatment) formed on at least one of the substrates may preferably comprise a polyimide film represented by the following formula (P) as a recurring unit.

Formula (P)

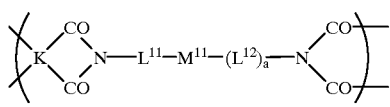

in which

K is

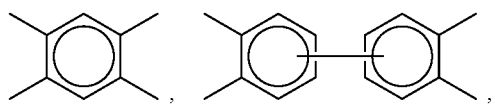

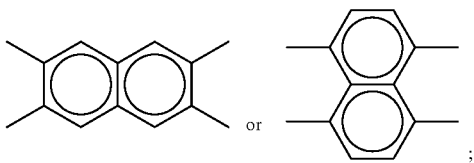

$L^{11}$ and $L^{12}$ independently denote

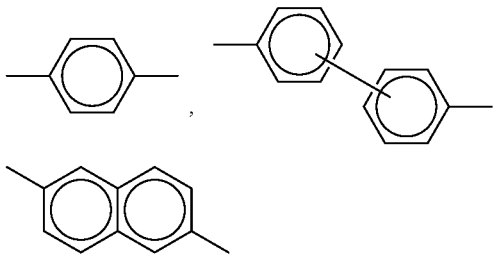

or an alkylene group having 1–20 carbon atoms; $M^{11}$ is a single bond or —O—; and a is 0, 1 or 2.

Specific examples of the polyimide of the formula (P) include those having the following recurring units shown below.

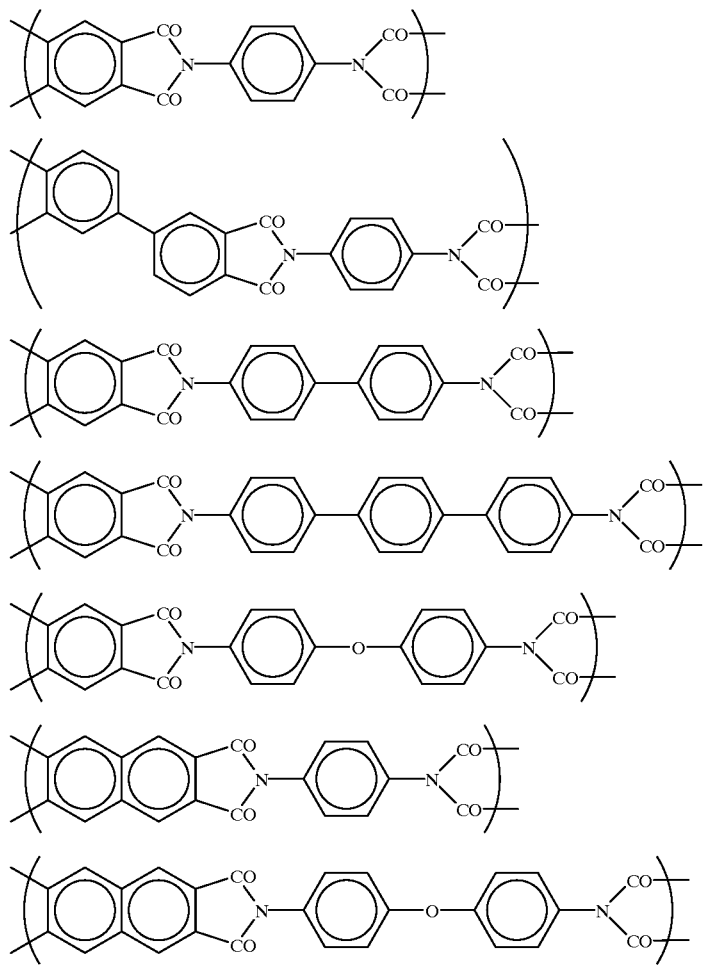

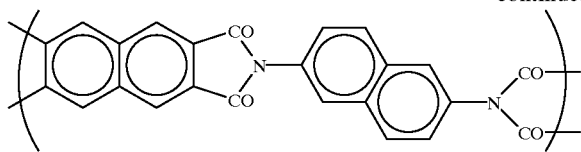
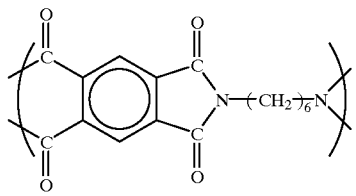
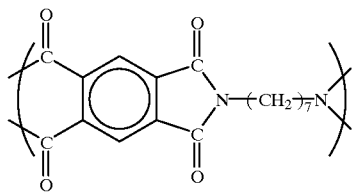
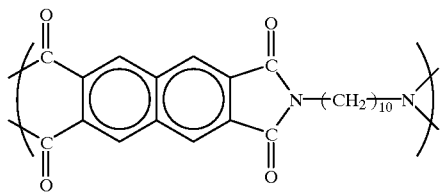
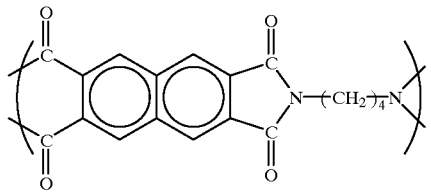
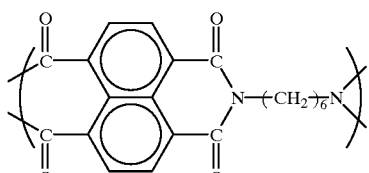
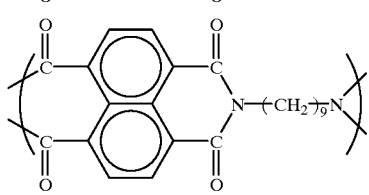
Other specific examples of the alignment control layer may include polymers having the following recurring units.
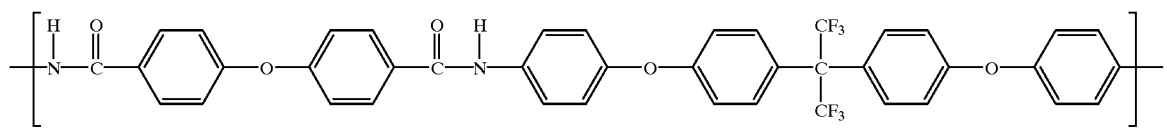

-continued

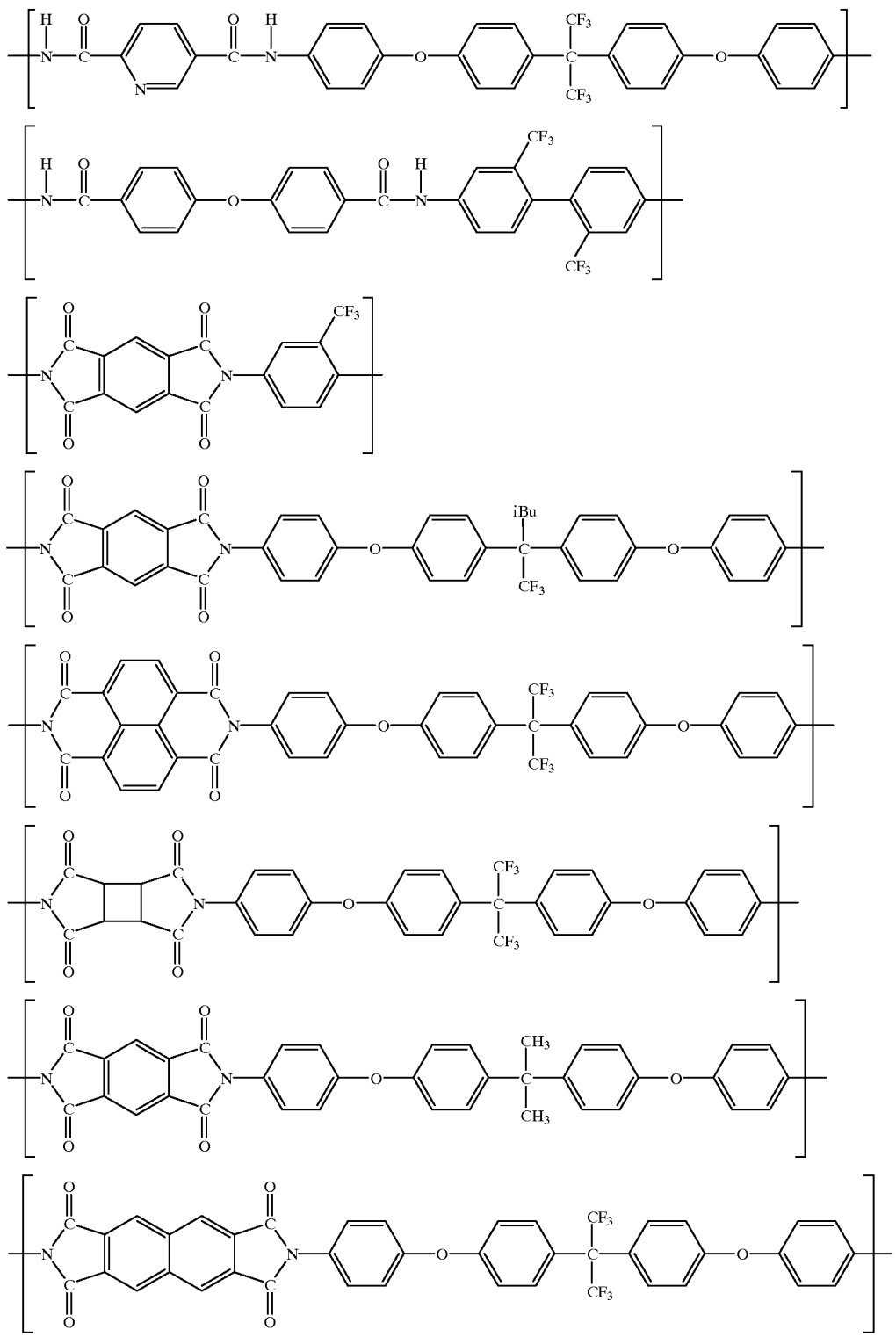

The alignment control layer formed on at least one of the substrate may include a film comprising a matrix containing oxide ultrafine particles dispersed therein and optionally doped with an electroconductivity-controlling impurity, as desired, in order to appropriately adjust a resistance of the resultant layer.

Preferred examples of the film may include a (wet) coating-type film comprising a matrix (binder material), such as SiOx (e.g., silica), an oxide-fusion matrix or a siloxane polymer matrix, containing, e.g., dispersed $SnO_2$ fine particles doped with an electroconductive-controlling impurity, e.g., Sb, as desired. Further it is also possible to use a film (coating-type film) of an oxide doped with an electroconductivity-controlling impurity, as desired.

The above films containing an oxide component may preferably have a volume resistivity of $10^4-10^{10}$ ohm.cm.

In the present invention, the alignment control layers 56 and 57 may include a combination of a uniaxial aligning-treated polyimide film and a (coating-type) film wherein oxide fine particles (doped with an electroconductivity-controlling impurity) are uniformly dispersed in a matrix as described above.

The liquid crystal device of the invention may further comprise a short circuit-preventing layer for the pair of substrates, a passivation layer as an insulating layer, another inorganic material layer and another organic material layer, preferably formed under the above-mentioned alignment control layer.

The passivation layer may preferably include a film of a dielectric material having a high-relative permittivity (dielectric constant) of at least 10 since the film is effective in suppressing an occurrence of short-circuit and a lowering in effective drive voltage. Examples of the dielectric material may include TaOx, $SrTiO_3$ and $BaTaO_6$. The passivation layer may be formed on at least one of the electrode (e.g.,ITO electrode) and may function as a dielectric layer together with the alignment control layer as a whole.

The liquid crystal layer 51 is disposed between the pair of substrates together with the spacer member 58 as shown in FIG. 5.

The spacer member 58 may preferably be in the form of beads or particles and comprise a material having an electrical conductivity larger than that of the liquid crystal material, thus exhibiting an appropriate electroconductivity set in view of a dispersion density and a drive waveform. More specifically, the material for the spacer member 58 may preferably have an electrical conductivity of at least $10^{-11}$ S/cm, more preferably $10^{-6}-10^{-11}$ S/cm.

The spacer particles as the spacer member 58 may preferably include particles, e.g., silica particles (as a matrix) coated or doped with a metal oxide, such as TiOx, SbOx or SnOx (x=an integer of 1–5). The value of x in the above oxide may appropriately selected in view of an electrical conductivity required.

The above electroconductive spacer particles 58 may be prepared by effecting surface-fusion (mechano-fusion) of powdery metal oxide, such a titanium oxide, tin oxide or antimony oxide, as described above, on the surface of a matrix, such as silica particles or synthetic resin particles, having an average particle size of 1–10 $\mu$m. Examples of the synthetic resin particles may include benzoquanamine resin particles ("Epostar", mfd. by Nippon Shokubai Kagaku Kogyo K.K.). Examples of apparatus for effecting surface-fusion may include commercially available apparatus ("AM-F-type Mechanofusion System", mfd. by Hosokawa Micron K.K.; "Disper Coat", mfd. by Nissin Engineering K.K.; Hybridization System", mfd. by K.K. Nara Kikai Seisakusho). As the spacer particles, it is also possible to use spherical fine particles of an inorganic oxide (e.g., those of tungsten oxide and molybdenum oxide; volume resistivity $10^{5-7}$ ohm.cm, mfd. by Nippon Shokubai Kogyo K.K.) or electroconductive fine particles comprising metal-plated synthetic resin particles (e.g., "Micropearl AV", mfd. by Sekisui Fine Chemical K.K.).

The above-mentioned spacer particles may preferably be dispersed in a solvent (e.g., ethanol) and then formed on the dielectric layer (e.g., the alignment control layer) at a prescribed dispersion density, preferably 100–700 particles/$mm^2$.

In the liquid crystal device of the invention, a voltage is applied to the liquid crystal layer 1 in accordance with a switching signal from a signal power supply (not shown), thus effecting switching. As a result, the liquid crystal device functions as a light valve for a display device. Further, in case where two groups of electrodes 54 and 55 are arranged in matrix (so as to intersect with each other, e.g., at right angles) on the pair of substrates, it is possible to perform pattern display and pattern exposure, so that the liquid crystal device is used as a display portion for a personal computer, a word processor, etc., or a light valve for a printer.

In the liquid crystal devices of the present invention, the liquid crystal layer 51 may include a nematic liquid crystal material for use in a TN-mode or STN-mode, and a smectic liquid crystal material, preferably a chiral smectic liquid crystal composition having ferroelectricity.

The chiral smectic liquid crystal composition may desirably contain at least one species of a fluorine-containing mesomorphic compound which preferably has a structure including a fluorocarbon terminal portion and a hydrocarbon terminal portion connected by a central core and has smectic phase or latent smectic phase. The term "latent smectic phase" refers to a property of a compound concerned that the compound alone does not exhibit smectic phase but can be a component compatibly contained in smectic phase of a liquid crystal composition.

In a preferred class of the fluorine-containing mesomorphic compound, the fluorocarbon terminal portion may preferably be:

a group represented by the formula $-D^1-C_{xa}F_{2xa}-X$, where xa is 1–20; X is $-H$ or $-F$; $-D^1-$ is $-CO-O-(CH_2)_{ra}-$, $-O-(CH_2)_{ra}-$, $-(CH_2)_{ra}-$, $-O-SO_2-$, $-SO_2-$, $-SO_2-(CH_2)_{ra}-$, $-O-(CH_2)_{ra}-O-(CH_2)_{rb}-$, $-(CH_2)_{ra}-N(C_{pa}H_{2pa+1})-SO_2-$ or $-(CH_2)_{ra}-N(C_{pa}H_{2pa+1})-CO-$; where ra and rb are independently 1–20; and pa is 0–4; or a group represented by $-D^2-(C_{xb}F_{2xb}-O)_{za}-C_{ya}F_{2ya+1}$, wherein xb is 1–10 independently for each $(C_{xb}F_{2xb}-O)$; ya is 1–10; za is 1–10; $-D^2-$ is $-CO-O-C_{rc}H_{2rc}$, $-O-C_{rc}H_{2rc}-$ $-C_{rc}H_{2rc}$, $-O-(C_{sa}H_{2sa}-O)_{ta}-C_{rd}H_{2rd}-$, $-O-SO_2-$, $-SO_2-$, $-SO_2-C_{rc}H_{2rc}-$, $-C_{rc}H_{2rc}-N(C_{pb}H_{2pb+1})-SO_2-$, $-C_{rc}H_{2rc}-N(C_{pb}H_{2pb+1})-CO-$, or a covalent bond, where rc and rd are independently 1–20; sa is independently 1–10 for each $(C_{sa}H_{2sa}-O)$; ta is 1–6; and pb is 0–4.

It is particularly preferred to use a fluorine-containing mesomorphic compound of the following general formula (I) or general formula (II):

Formula (I):

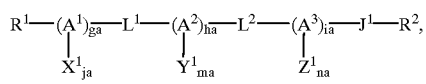

wherein $A^1$, $A^2$ and $A^3$ are each independently

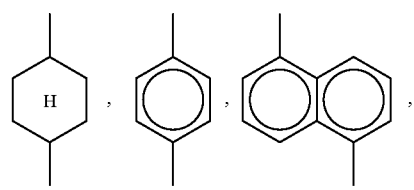

-continued

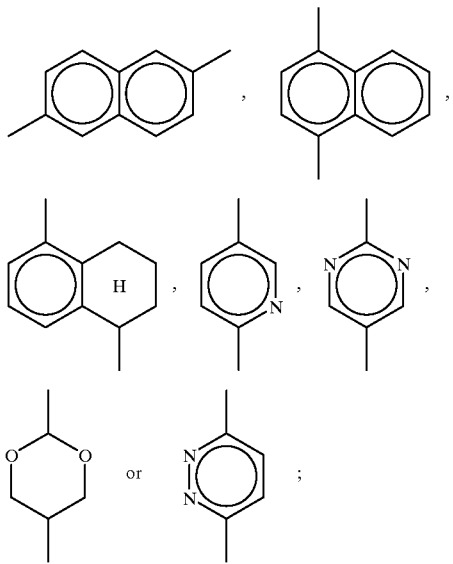

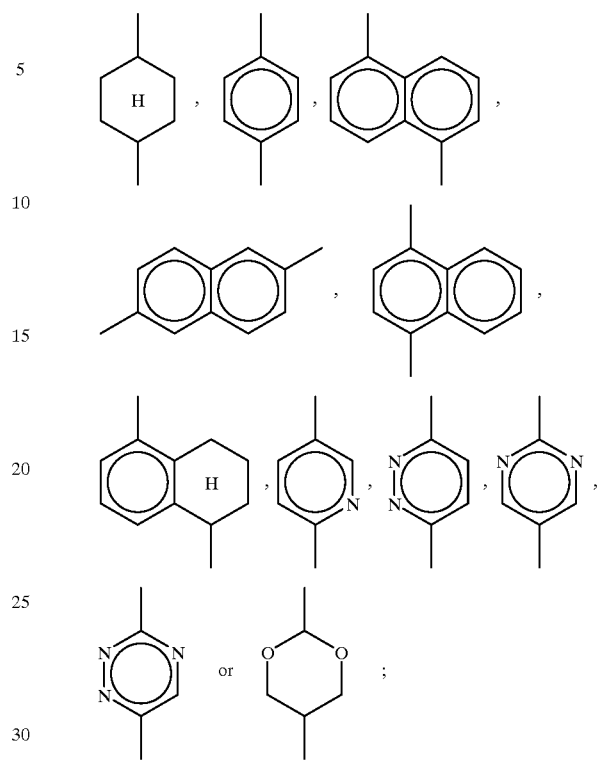

wherein $A^4$, $A^5$ and $A^6$ are each independently ga, ha and ia are independently an integer of 0–3 with the proviso that the sum of ga+ha+ia be at least 2;

$L^1$ and $L^2$ are each independently a covalent bond, —CO—O—, —O—CO—, —COS—, —S—CO—, —CO—Se—, —Se—CO—, —CO—Te—, —Te—CO—, —CH$_2$CH$_2$—, —CH=CH—, —C≡C—, —CH≡N—, —N=CH—, —CH$_2$—O—, —O—CH$_2$—, —CO— or —O—;

$X^1$, $Y^1$ and $Z^1$ are each a substituent of $A^1$, $A^2$ and $A^3$, respectively, and each $X^1$, $Y^1$ and $Z^1$ are independently —H, —Cl, —F, —Br, —I, —OH, —OCH$_3$, —CH$_{31}$, —CN or —NO$_2$;

each ja, ma and na are independently an integer of 0–4;

$J^1$ is —CO—O—(CH$_2$)$_r$—, —O—(CH$_2$)$_{ra}$—, —(CH$_2$)$_{ra}$—, —O—SO$_2$—, —SO$_2$—, —SO$_2$—(CH$_2$)$_{ra}$—, —O—(CH$_2$)$_{ra}$—O—(CH$_2$)$_{rb}$—, —(CH$_2$)$_{ra}$—N(C$_{pa}$H$_{2pa+1}$)—SO$_2$— or —(CH$_2$)$_{ra}$—N(C$_{pa}$H$_{2pa+1}$)—CO—; where ra and rb are independently 1–20, and pa is 0–4;

$R^1$ is —O—C$_{qa}$H$_{2qa}$—O—C$_{qb}$H$_{2qb+1}$, —C$_{qa}$H$_{2qa}$—O—C$_{qb}$H$_{2qb+1}$, —C$_{qa}$H$_{2qa}$—R$^3$, —O—C$_{qa}$H$_{21qa}$—R$^3$, —CO—O—C$_{qa}$H$_{2qa}$—R$^3$, or —O—CO—C$_{qa}$H$_{2qa}$—R$^3$ which may be either straight chain or branched; where $R^3$ is —O—CO—C$_{qb}$H$_{2qb+1}$, —CO—O—C$_{qb}$H$_{2qb+1}$, —H, —Cl, —F, —CF$_3$, —NO$_2$ or —CN; and qa and qb are independently 1–20;

$R^2$ is $C_{xa}F_{2xa}$—X, where X is —H or —F, xa is an integer of 1–20.

Formula (II):

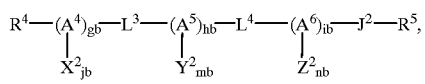

gb, hb and ib are each independently an integer of 0–3 with the proviso that the sum of gb+hb+ib be at least 2;

each $L^3$ and $L^4$ are independently a covalent bond, —CO—O—, —O—CO—, —CO—S—, —S—CO—, —CO—Se—, —Se—CO—, —CO—Te—, —Te—CO—, —(CH$_2$CH$_2$)$_{ka}$— (ka is 1–4), —CH=CH—, —C≡C—, —CH=N—, —N=CH—, —CH$_2$—O—, —O—CH$_2$—, —CO— or —O—;

$X^2$, $Y^2$ and $Z^2$ are each a substituent of $A^4$, $A^5$ and $A^6$, respectively, and each $X_2$, $Y_2$ and $Z_2$ are independently —H, —Cl, —F, —Br, —I, —OH, —OCH$_3$, —CH$_3$, —CF$_3$, —O—CF$_3$, —CN or —NO$_2$; each jb, mb and nb are independently an integer of 0–4;

$J^2$ is —CO—O—C$_{rc}$H$_{2r}$—, —O—C$_{rc}$H$_{2rc}$—, —C$_{rc}$H$_{2rc}$—, —O—(C$_{sa}$H$_{2sa}$—O)$_{ta}$—C$_{rd}$H$_{2rd}$—, —O—SO$_2$—, —SO$_2$—, —SO$_2$—C$_{rc}$H$_{2rc}$—, —C$_{rc}$H$_{2rc}$—N(C$_{pb}$H$_{2pb+1}$)—SO$_2$— or —C$_{rc}$H$_{2rc}$—N(C$_{pb}$H$_{2pb+1}$)—CO—; rc and rd are independently 1–20; sa is independently 1–10 for each (C$_{sa}$H$_{2sa}$—O), ta is 1–6; pb is 0–4;

$R^4$ is —O—(C$_{qc}$H$_{2qc}$—O)$_{wa}$—C$_{qd}$H$_{2qd+1}$, —(C$_{qc}$H$_{2qc}$—O)$_{wa}$—C$_{qd}$H$_{2qd+1}$, —C$_{qc}$H$_{2qc}$—R$^6$, —O—C$_{qc}$H$_{2qc}$—R$^6$, —CO—O—C$_{qc}$H$_{2qc}$—R$^6$, or O—CO—C$_{qc}$H$_{2qc}$—R$^6$ which may be either straight chain or branched; $R^6$ is —O—CO—C$_{qd}$H$_{2qd+1}$; —CO—O—C$_{qd}$H$_{2qd+1}$, —Cl, —F, —CF$_3$, —NO$_2$, —CN or —H; qc and qd are independently an integer of 1–20; wa is an integer of 1–10;

$R^5$ is (C$_{xb}$F$_{2xb}$—O)$_{za}$—C$_{ya}$F$_{2ya+1}$, wherein xb is independently 1–10 for each (C$_{xb}$F$_{2xb}$—O); ya is 1–10; and za is 1–10.

The compounds represented by the general formula (I) may be obtained through a process described in U.S. Pat. No. 5,082,587 (corr. to JP-A 2-142753). Specific examples of the compound of the formula (I) may also include those enumerated therein.

The compounds represented by the general formula (II) may be obtained though a process described in PCT Publication WO93/22396 (corr. to JP (Tokuhyo) 7-506368). Specific examples of the compound of the formula (II) may also include those enumerated therein.

The chiral smectic liquid crystal composition may include at least one mesomorphic compound having cyclic core structure (e.g., benzene ring or pyrimidine ring) connecting both terminal chains each comprising a hydrocarbon.

Other liquid crystal materials (particularly suitable for a component of the chiral smectic liquid crystal composition) usable in the present invention may include those as described in WO86/04060 and those shown at pages 23–39 of JP-A 4-272982.

The liquid crystal material (composition) used in the invention may further contain additives such as an antioxidant, an ultraviolet ray-absorbing agent, dyes and pigments.

In the liquid crystal device of the present invention, the above-described relationships between electrical properties (resistances, capacitance, etc.) of respective constituent layers are appropriately controlled by suitably designing or selecting the device structure, the liquid crystal material, the alignment control layer, the passivation layer, other function layers, the spacer member and their electrical properties.

The liquid crystal device according to the present invention may be driven by using driving methods as disclosed in, e.g., JP-A 59-193426, JP-A 59-193427, JP-A 60-156046 and JP-A 60-156047.

Figure 6A:
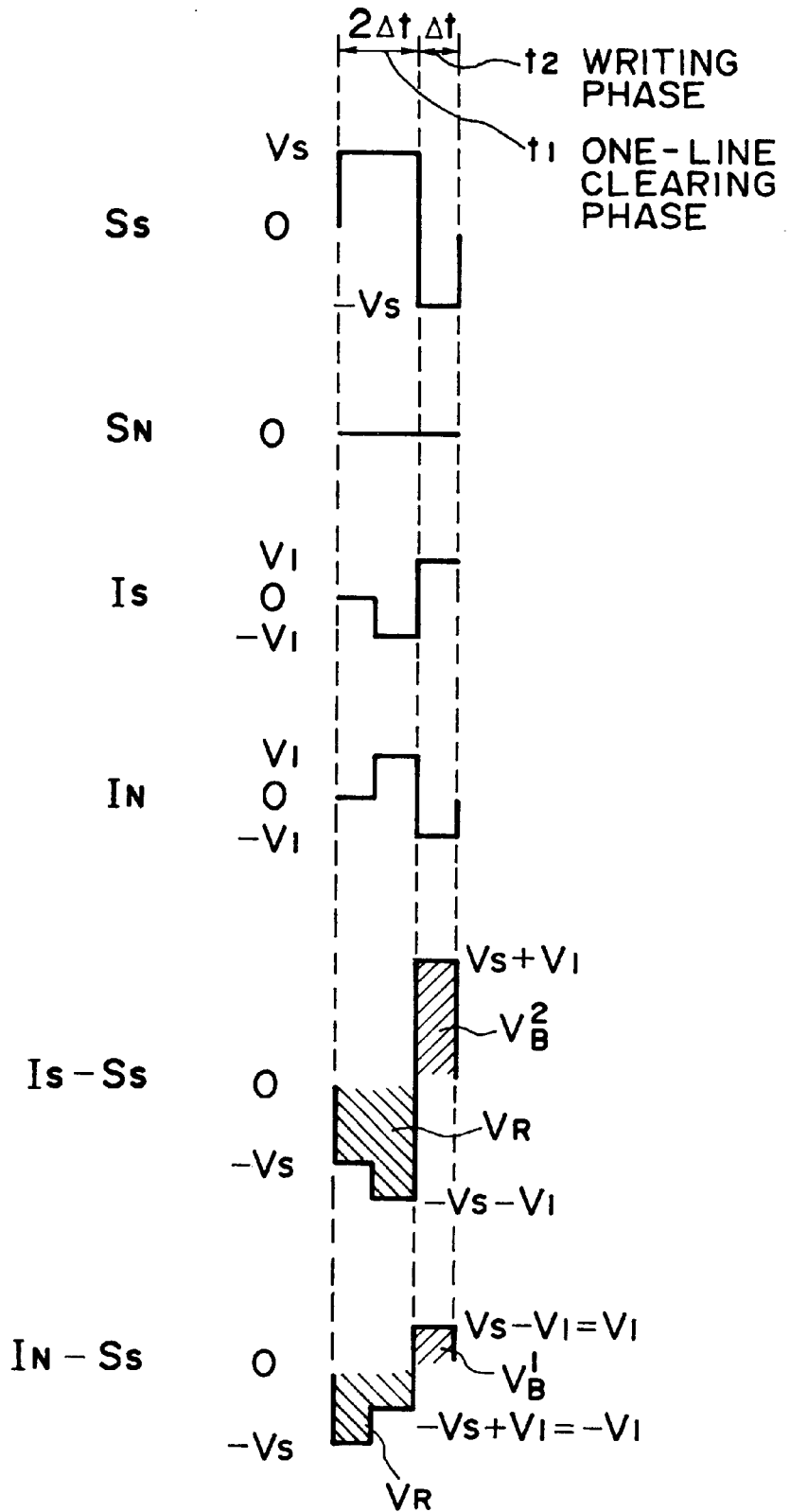
FIG. 6A shows an embodiment of unit driving waveforms.
Figure 6B:
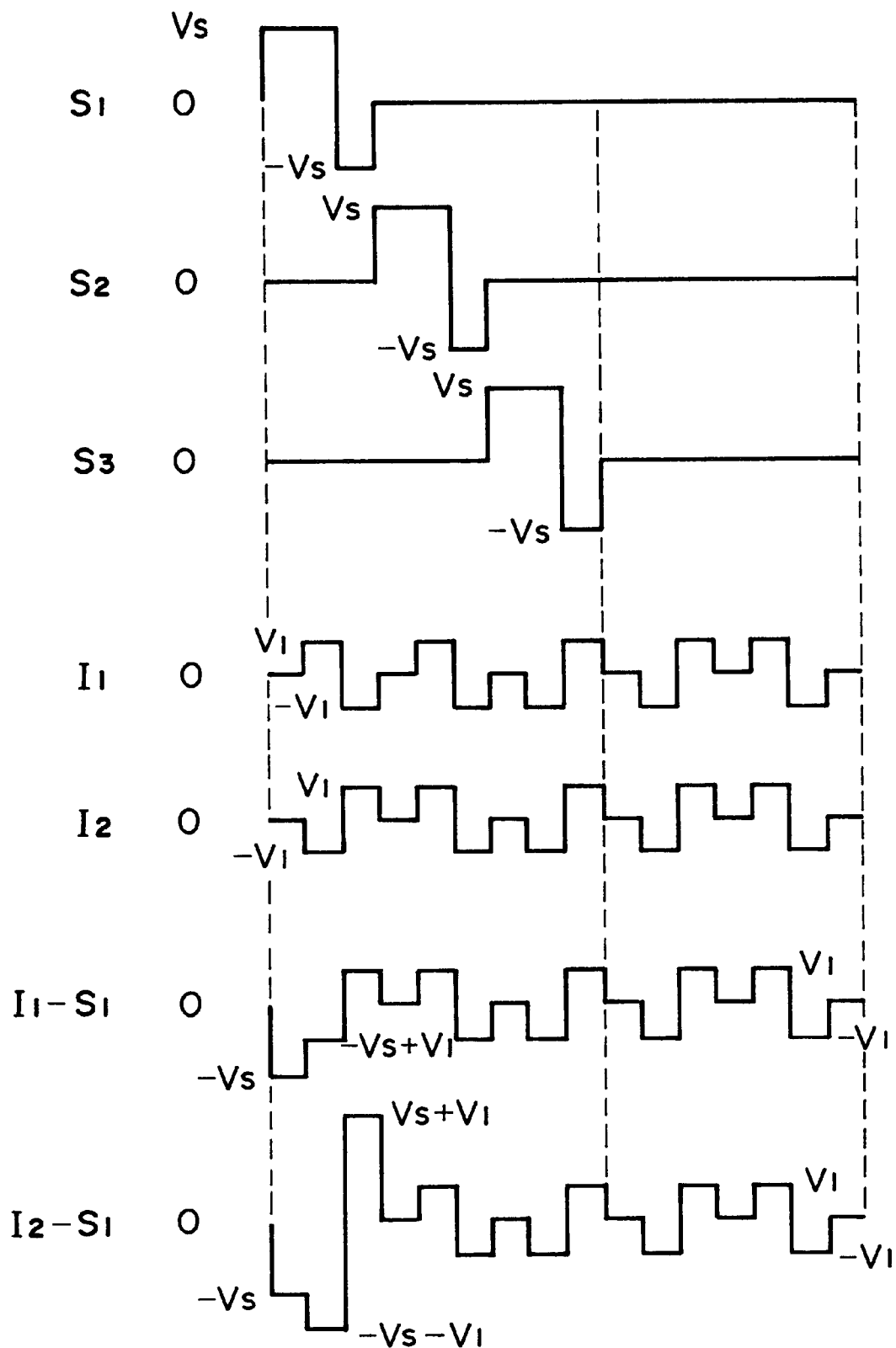
FIG. 6B is time-serial waveforms comprising a succession of such unit waveforms.
Figure 7:
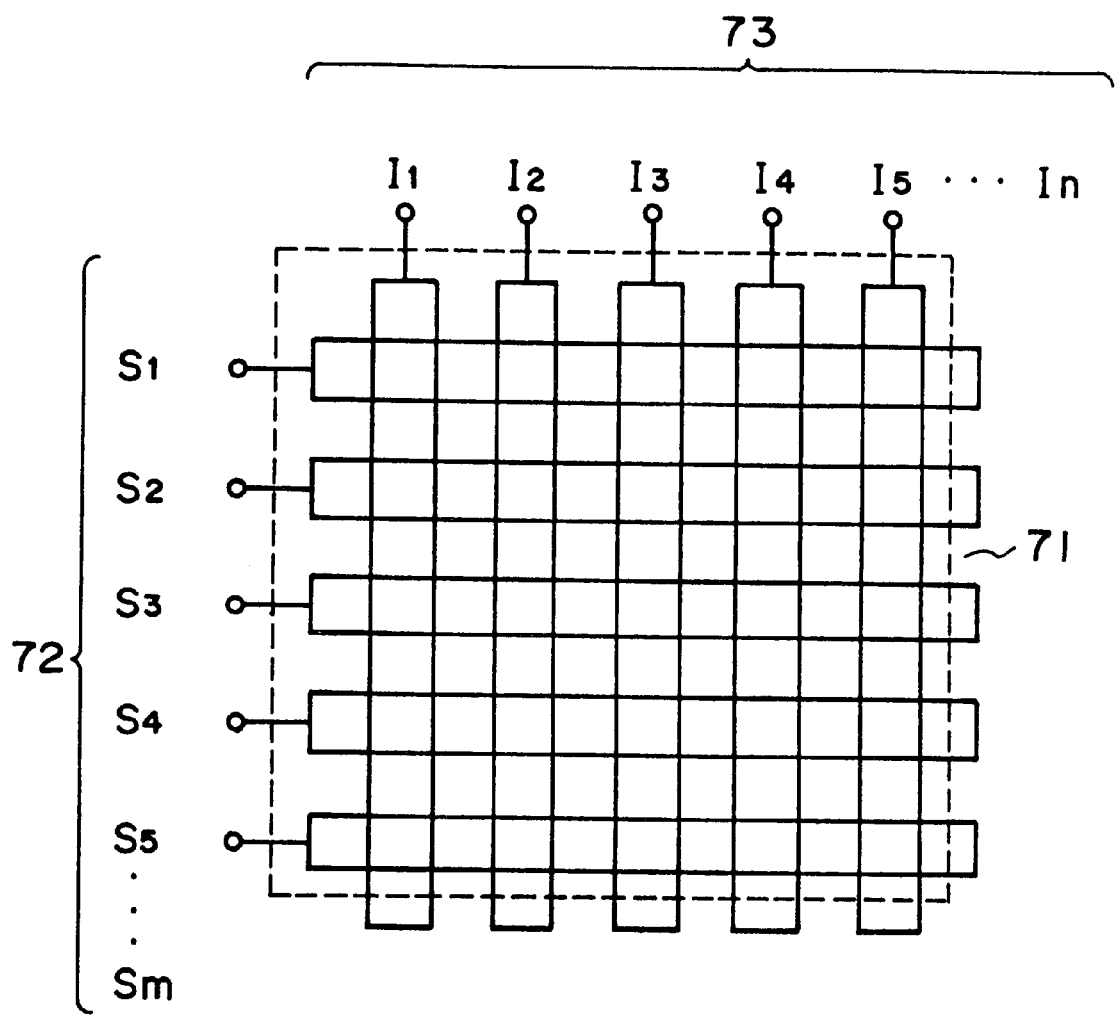
FIG. 7 is a plan view of an electrode matrix.

FIGS. 6A and 6B are waveform diagrams showing an example set of driving waveforms used in such a driving method. FIG. 7 is a plan view showing an electrode matrix used in a liquid crystal panel 71 of a simple matrix-type. The liquid crystal panel 71 shown in FIG. 7 includes scanning electrodes 72 ($S_1, S_2, S_3, \ldots S_m$) and data electrodes 73 ($I_1, I_2, I_3, \ldots I_n$) intersecting each other so as to constitute a pixel at each intersection together with the liquid crystal material disposed between the scanning electrodes 72 and data electrodes 73.

Figure 8:
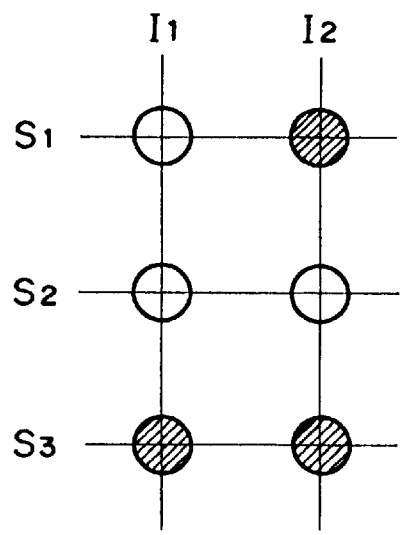
FIG. 8 is an illustration of a display pattern obtained by an actual drive using the time-serial waveforms shown in FIG. 6B.

Referring to FIG. 6A, at $S_S$ is shown a selection scanning signal waveform applied to a selected scanning line in one-line scanning period (1H period), at $S_N$ is shown a non-selection scanning signal waveform applied to a non-selected scanning line in 1H period, at $I_S$ is shown a selection data signal waveform (providing a black (dark) display state) applied to a selected data line in 1H period, and at $I_N$ is shown a non-selection data signal waveform (providing a white (bright) display state) applied to a non-selected data line in 1H period. Further, at $I_S-S_S$ and $I_N-S_S$ in the figure are shown voltage waveforms applied to pixels on a selected scanning line, whereby a pixel supplied with the voltage $I_S-S_S$ assumes a black display state and a pixel supplied with the voltage $I_N-S_S$ assumes a white display state. FIG. 6B shows a time-serial waveform used for providing a display state as shown in FIG. 8.

In the driving embodiment shown in FIGS. 6A and 6B, a minimum duration (application time) $\Delta t$ of a single polarity voltage applied to a pixel on a selected scanning line corresponds to the period of a writing phase $t_2$, and the period of a one-line clearing phase $t_1$ is set to $2\Delta t$. In the one-line clearing phase $t_1$, the display state is reset to provide a white display state in this embodiment.

The parameters $V_S$, $V_I$ and $\Delta t$ in the driving waveforms shown in FIGS. 6A and 6B are determined depending on switching characteristics of a liquid crystal material used.

Figure 9:
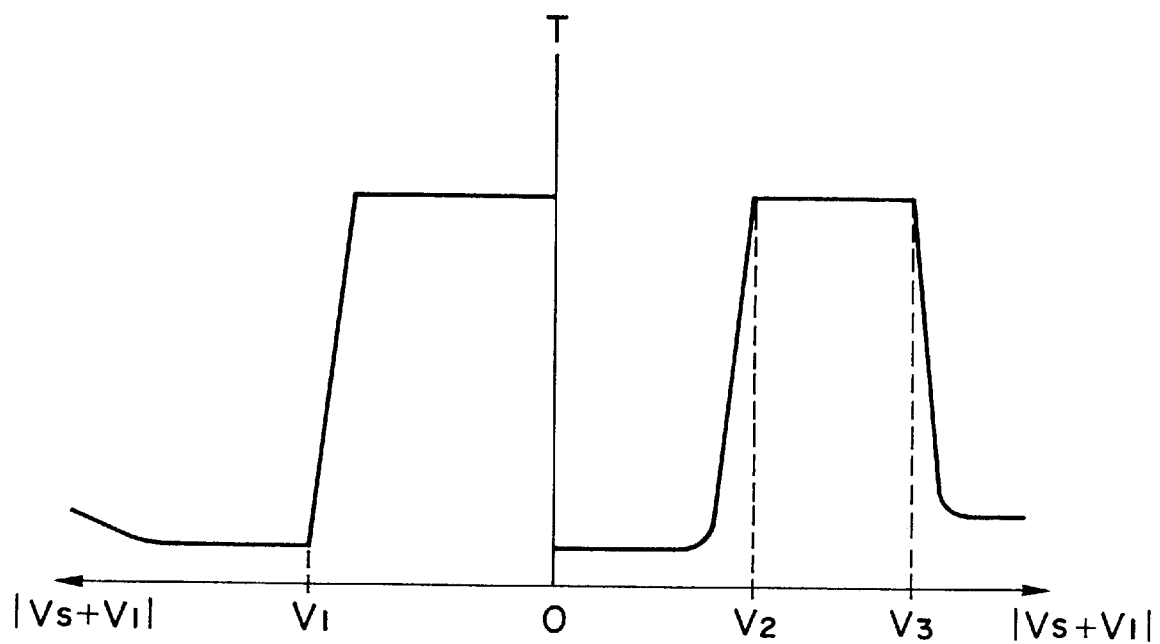
FIG. 9 is a V-T characteristic chart showing a change in transmittance under application of different drive voltages.

FIG. 9 shows a V-T characteristic, i.e., a change in transmittance T (ordinate) when a driving voltage (abscissa) denoted by ($V_S+V_I$) (absolute value) is changed (to provide a larger value proportional to a distance from the origin) while a bias ratio as mentioned hereinbelow is kept constant. In this embodiment, the parameters are fixed at constant values of $t=50 \mu s$ and a bias ratio $V_I/(V_I+V_S)$ 1/3. On the right side of FIG. 9 is shown a result when the voltage ($I_N-S_S$) shown in FIG. 6A is applied to a pixel concerned previously set in a black state (previous state). On the left side of FIG. 9 is shown a result when the voltage ($I_S-S_S$) is applied to a pixel concerned previously set in a white state. At ($I_N-S_S$) and ($I_S-S_S$), a previous (display) state is cleared in a white state by applying a voltage $V_R$ and a subsequent (display) state is determined by voltages $V_B^1$ and $V_B^2$, respectively. Referring to FIG. 9, a relationship of $V_2<V_1<V_3$ holds. The voltage $V_1$ may be referred to as a threshold voltage in actual drive and the voltage $V_3$ may be referred to as a crosstalk voltage. More specifically, as shown in FIG. 6A, a voltage $V_1$ denotes a voltage value causing switching (white to black) by applying a voltage signal $V_B^2$ and a voltage $V_3$ denotes a voltage value unexpectedly causing switching (white to black) by applying a voltage signal $V_B^1$. Further, a voltage $V_2$ denotes a voltage value required for clearing the previous state into a white state by applying a voltage signal $V_R$. The crosstalk voltage $V_3$ is generally present in actual matrix drive of a (ferroelectric) chiral smectic liquid crystal device. In an actual drive, $\Delta V=V_3-V_1$ provides a voltage range of $|V_S+V_I|$ allowing a matrix drive and may be referred to as a (drive) voltage margin. It is of course possible to provide the increased value of $V_3$ leading to a larger voltage margin $\Delta V$ (=$V_3-V_1$) by increasing the bias ratio (i.e., by causing the bias ratio to approach a unity). However, a large bias ratio corresponds to a large amplitude of a data signal and leads to an increase in flickering and a lowering in contrast, thus being undesirable in respect of image quality. According to our study, a bias ratio of about 1/3–1/4 was practical. On the other hand, when the bias ratio is fixed, the voltage margin V largely depends on the switching characteristics of a liquid crystal material used and a device structure adopted, and it is needless to say that a liquid crystal device providing a large $\Delta V$ is very advantageous for matrix drive.

Further, it is possible to drive the liquid crystal device by changing a minimum voltage application time (minimum duration) $\Delta t$ while keeping the driving voltage ($V_S+V_I$) so as to provide a certain (constant) value. At this time, it is possible to provide a graph similar to that of FIG. 9 except that the minimum voltage application time $\Delta t$ is taken as the abscissa instead of the driving voltage ($V_S+V_I$). In this case, the drive characteristic of the liquid crystal device can be evaluated in terms of a duration margin (voltage application time margin) $\Delta T=\Delta t_2-\Delta t_1$ wherein $\Delta t_1$ denotes a threshold duration and $\Delta t_2$ denotes a crosstalk duration. The duration margin $\Delta T$ means a duration allowing a matrix drive under application of a certain driving voltage ($V_S+V_I$).

As described above, depending on the directions of two different data signals, the voltage margin $\Delta V$ and duration margin $\Delta T$ each allow such a display state that selected pixels are written in two states of "black" and "white" and non-selected pixels can retain the previous "black" or "white" state. At the certain temperature, the voltage margin and the duration margin vary depending on a liquid crystal material used and a cell structure employed and are intrinsic to a liquid crystal device used. Further, the driving margin (voltage or duration margin) is changed according to a change in environmental temperature, so that it is necessary to provide optimum driving conditions for an actual display apparatus in view of a liquid crystal material used, a cell (device) structure and an environmental temperature.

Figure 12:
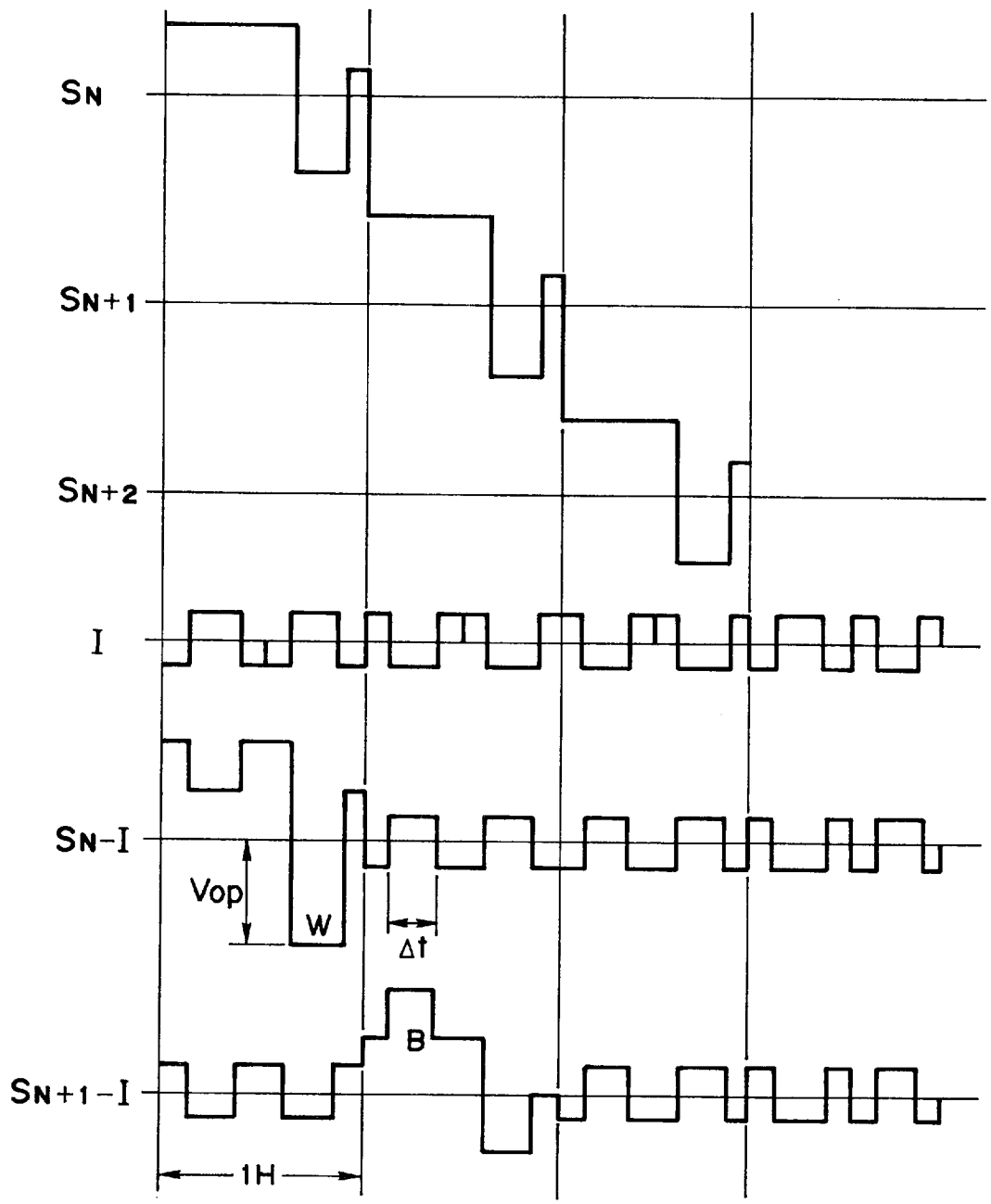
FIG. 12 is a set of drive waveforms used for measurement of a drive margin parameter (M2) in Examples as to the present invention.

In the present invention, in order to effect a quantitative evaluation of the drive margin, the above threshold duration $\Delta t_1$ and the crosstalk duration $\Delta t_2$ are measured by using a certain driving waveform (as shown in FIG. 12) to obtain a duration margin parameter M2 (M2 margin) which is a parameter of a duration range on the basis of an average (central) value of these values. The M2 margin is represented by the following equation:

(M2 margin)=$(\Delta t_2 - \Delta t_1)/(\Delta t_2 + \Delta t_1)$.

The liquid crystal device according to the present invention is used as a display element (medium), for various liquid crystal apparatus, one embodiment of which is described below.

Figure 10:
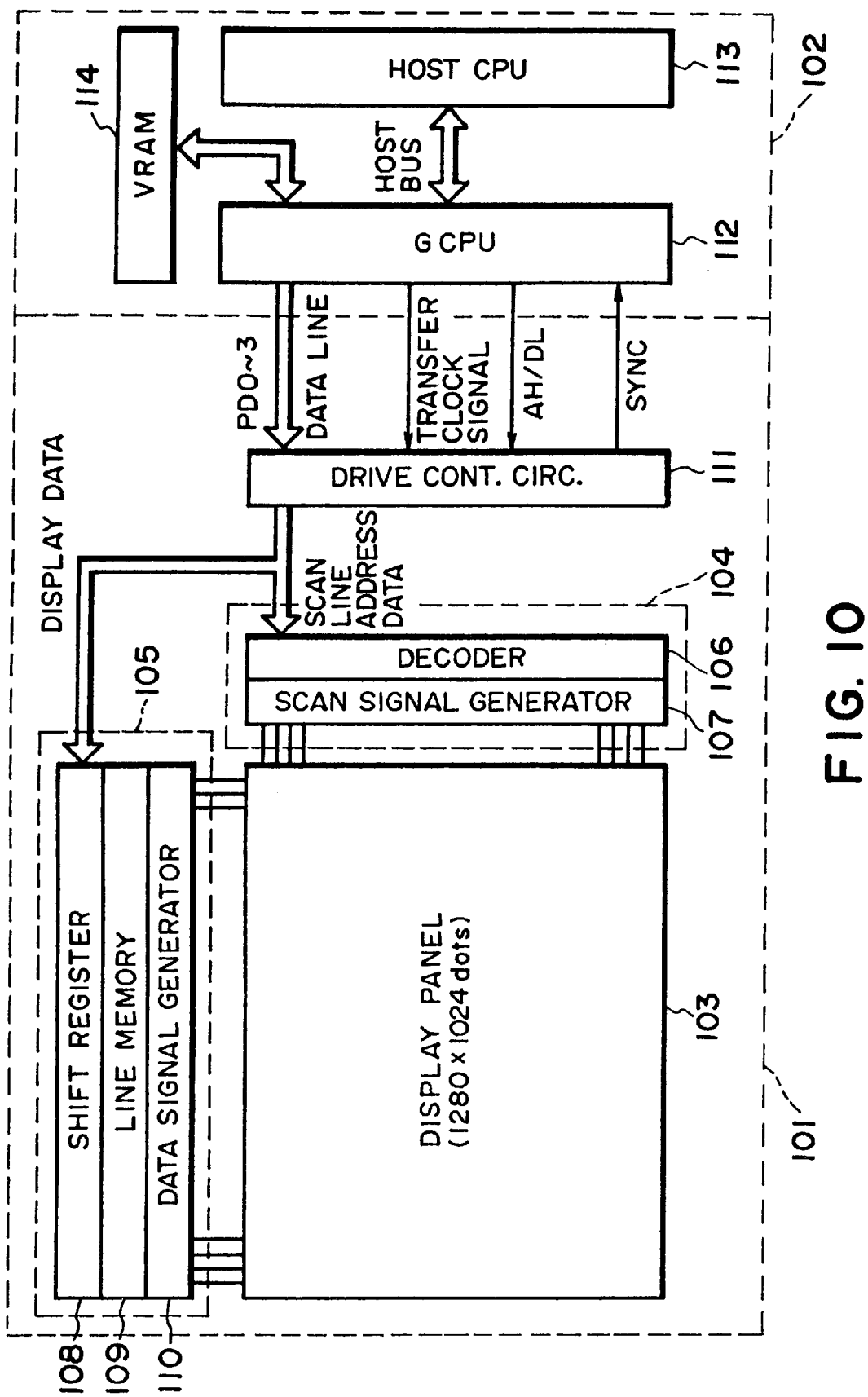
FIG. 10 is a block diagram showing a display apparatus comprising a liquid crystal device of the present invention and a graphic controller.
Figure 11:
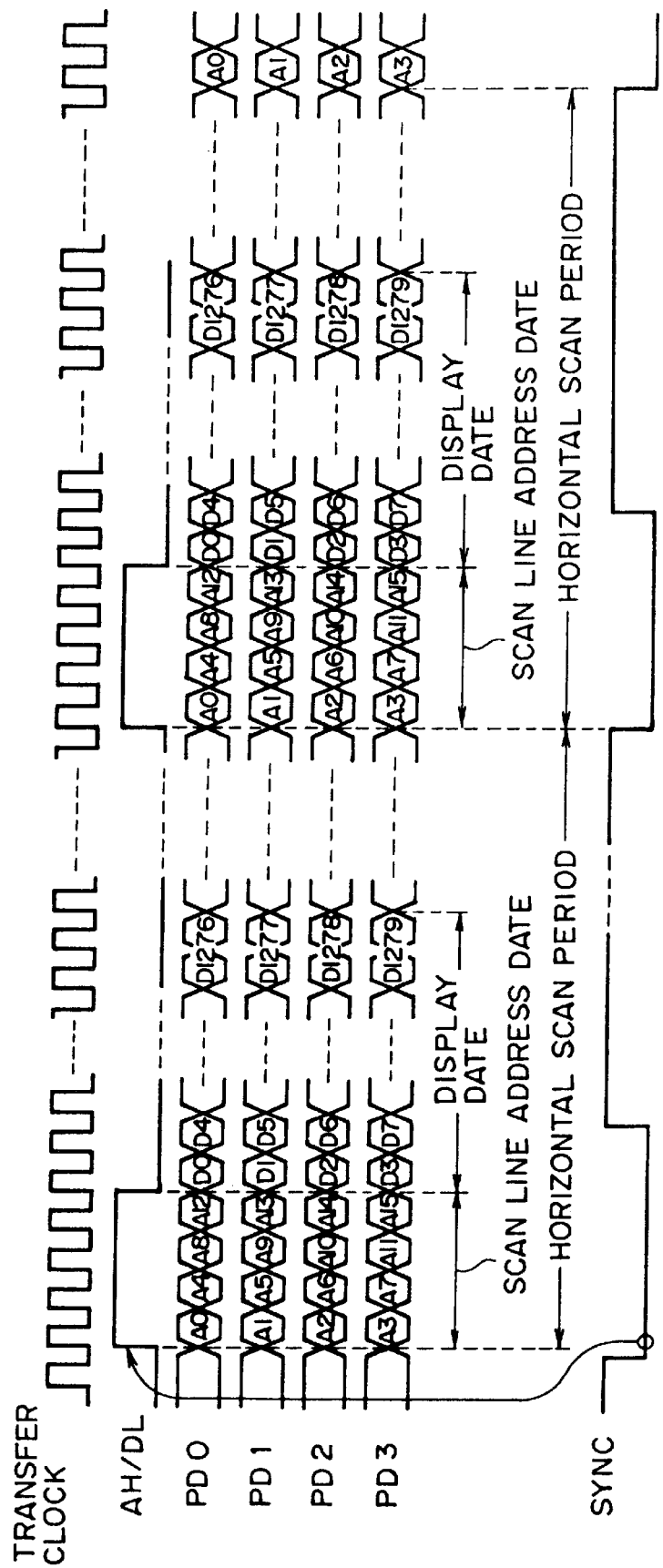
FIG. 11 is a time chart of image data communication showing time correlation between signal transfer and driving with respect to a liquid crystal display apparatus and a graphic controller.

Based on an arrangement appearing hereinbelow and data format comprising image data accompanied with scanning line address data and by adopting communication synchronization using a SYNC signal as shown in FIGS. 10 and 11, there is provided a liquid crystal display apparatus of the present invention which uses the liquid crystal device according to the present invention as a display panel portion.

Referring to FIG. 10, a chiral smectic liquid crystal display apparatus 101 includes a graphic controller 102, a display panel 103, a scanning line drive circuit 104, a data line drive circuit 105, a decoder 106, a scanning signal generator 107, a shift resistor 108, a line memory 109, a data signal generator 110, a drive control circuit 111, a graphic central processing unit (GCPU) 112, a host central processing unit (host CPU) 113, and an image data storage memory (VRAM) 114.

Image data are generated in the graphic controller 102 in an apparatus body and transferred to a display panel 103 by signal transfer means. The graphic controller 102 principally comprises a CPU (central processing unit, referred to as "GCPU") 112 and a VRAM (video-RAM, image data storage memory) 114 and is in charge of management and communication of image data between a host CPU 113 and the liquid crystal display apparatus 101. The control of the display apparatus is principally performed by the graphic controller 102. A light source (not shown) is disposed behind the display panel 103.

The liquid crystal (display) apparatus of the present invention employs the above-described liquid crystal device showing a good switching characteristic as a display panel (medium), so that the apparatus exhibits excellent drive characteristics and provides high-definition and large-area display images at high speed.

Hereinbelow, the present invention will be described more specifically based on Examples. It is however to be understood that the present invention is not restricted to these Examples.

EXAMPLE 1

A liquid crystal composition FLC-1 was prepared by mixing the following compounds (a) to (e) in the indicated proportions, respectively, and showed a phase transition series (°C.), and an electrical conductivity $\sigma_{LC}$ shown below, respectively.

| Compound No. | Structural formula |
|---|---|
| (a) | 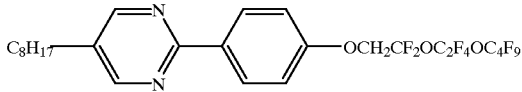 |
| (b) | 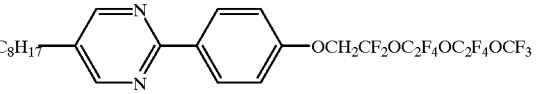 |
| (c) | 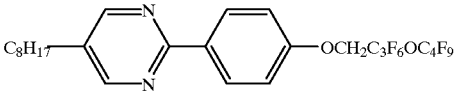 |
| (d) | 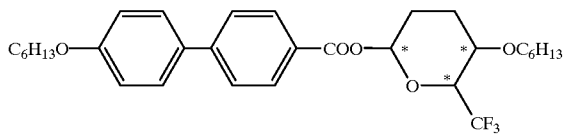 |
| (e) | 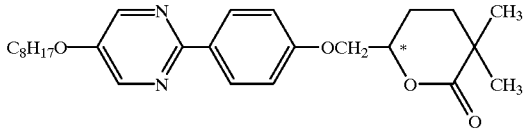 |

<Proportion>

(components)   (wt. parts)
(a):(b):(c):(d):(e) = 45:30:15:5:2

Phase transition (°C.):

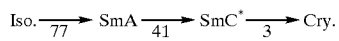
Iso. →77 SmA →41 SmC* →3 Cry.

Ps (30° C.)=−31.1 nC/cm$^2$
$\sigma_{LC}$ (30° C.)=10$^{-12}$ S/cm

Then, five substrates (Substrates A to E) were prepared in the following manner, respectively.

<Substrate A>

A 1.1 μm-thick glass substrate was coated with a ca. 150 nm-thick ITO film (transparent electrode) and further coated with a 0.5%-solution of a precursor of polyimide having a recurring unit of the shown below by spin coating at 500 rpm for 10 sec. (1st) and at 1500 rpm for 30 sec. (2nd), followed by pre-drying at 80° C. for 5 min. and hot baking at 200° C. for 1 hour to form a 5 nm-thick alignment control layer, which was then rubbed with a nylon cloth to effect a uniaxial aligning treatment.

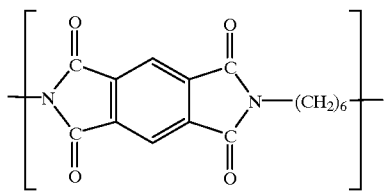

<Substrate B>

A 1.1 mm-thick glass substrate provided with a ca. 150 nm-thick ITO film (transparent electrode) was coated with a 10 wt. % (solid content)-solution of a ladder-type polysiloxane containing antimony-doped SnO$_2$ ultrafine particles (60 wt. %; particle size=100 Å) by spin coating, followed by pre-drying at 80° C. for 5 min. and hot baking at 200° C. for 1 hour to form a 2000 Å-thick alignment control layer.

<Substrate C>

A 1.1 mm-thick glass substrate provided with a ca. 150 nm-thick ITO film (transparent electrode) was coated with a 10 wt. % (solid content)-solution of a ladder-type polysiloxane containing antimony-doped SnO$_2$ ultrafine particles (5 wt. %; particle size=100 Å) by spin coating, followed by pre-drying at 80° C. for 5 min. and hot baking at 200° C. for 1 hour to form a 2000 Å-thick alignment control layer.

<Substrate D>

A 1.1 mm-thick glass substrate provided with a ca. 150 nm-thick ITO film (transparent electrode) was coated with a 70 nm-thick TaOx film by using a DC sputtering process under the following sputtering conditions.

Target: Tantalum pentoxide sintering target (purity= 99.9%, mfd. by Mitsui Kinzoku K.K.)
Pressure: 3 mTorr
Ar/O$_2$: 150 sccm/50 sccm
Power: 2 kW Then, the thus-treated glass substrate was further coated with a 10 wt. % (solid content)solution of a ladder-type polysiloxane containing antimony-doped SnO$_2$ ultrafine particles (60 wt. %; particle size=100 Å) by spin coating, followed by pre-drying at 80° C. for 5 min. and hot baking at 200° C. for 1 hour to form a 2000 Å-thick alignment control layer.

<Substrate E>

A 1.1 mm-thick glass substrate provided with a ca. 150 nm-thick ITO film (transparent electrode) was coated with a 70 nm-thick TaOx film by using a DC sputtering process under the following sputtering conditions.

Target: Tantalum pentoxide sintering target (purity= 99.9%, mfd. by Mitsui Kinzoku K.K.)
Pressure: 3 mTorr
Ar/O$_2$: 150 sccm/50 sccm
Power: 2 kW Then, the thus-treated glass substrate was further coated with a 10 wt. % (solid content)-solution of a ladder-type polysiloxane containing antimony-doped SnO$_2$ ultrafine particles (5 wt. %; particle size=100 Å) by spin coating, followed by pre-drying at 80° C. for 5 min. and hot baking at 200° C. for 1 hour to form a 2000 Å-thick alignment control layer.

The thus-prepared substrates (Substrates A–E) were subjected to measurement of a sheet resistance $R_{sheet}$ and total capacitance $C_{total}$ (as a dielectric layer) in the manner shown below, whereby the following results (Table 1) were obtained.

TABLE 1

| Substrate | $R_{sheet}$ (ohm/□) | $C_{total}$ (nF) |
|---|---|---|
| A | at least 10$^{15}$ | 200 |
| B | 10$^5$ | —*1 |
| C | 10$^{11}$ | —*1 |
| D | 10$^5$ | 200 |
| E | 10$^{11}$ | 200 |

*1: Negligible due to a low-resistance film in the vertical (normal) direction.

(Measurement of sheet resistance)

A sheet resistance ($R_{sheet}$) was measured at 30° C. in the following manner.

On a glass substrate, an objective film (single layer or lamination layer) identical to that of the associated substrate except for omitting the ITO electrode was formed to prepare a sample substrate.

A current was flowed between an annular-shaped electrode (outer diameter=18 mm, inner diameter=11 mm) and a circular-shaped electrode (diameter=6 mm; disposed within and concentrically with the annular-shaped electrode) both formed on the objective film of the sample substrate to obtain a resistance in a sheet extension direction thereof. Herein, the thus obtained resistance value was used as a sheet resistance ($R_{sheet}$) of the objective film.

(Measurement of electrical capacity)

An electrical capacitance ($C_{total}$) of an objective dielectric layer (single layer or lamination layer) of the associated substrate was measured at 30° C. in the following manner.

A current was flowed between an e.g., 1 mm-dia. Al electrode formed on the objective dielectric layer and the associated ITO electrode formed on the associated substrate in a thickness (vertical) direction to the substrate to obtain a capacitance of the objective dielectric layer. The thus obtained capacitance value was converted into a value per unit area (1 cm×1 cm) to determine a total electrical capacitance ($C_{total}$) of the objective dielectric layer.

Then, by using appropriately selected two substrates from the above-prepared substrates, 10 blank cells were prepared by dispersing one species of spacer beads (Spacers A–C shown in Table 2 below) on one of the substrates at an average dispersion density of 300 particles/mm$^2$ and then applying the other substrate to the above one substrate so as to form an electrode matrix.

TABLE 2

| Spacer | Material | Average particle size ($\mu$m) | Conductivity (S/cm) |
|---|---|---|---|
| A | Silica beads | 2.0 | at most $10^{-14}$ |
| B | titanium oxide-coated silica beads | 2.0 | $10^{-9}$ |
| C | titanium oxide-coated silica beads | 2.0 | $10^{-4}$ |

Then, the above-prepared liquid crystal composition FLC-1 was filled in each of the above-prepared 10 blank cells under heating to prepare 10 liquid crystal cells (device) having structural members shown in Table 3.

TABLE 3

| Device | 1st substrate | 2nd substrate | Spacer |
|---|---|---|---|
| 1-1 | Substrate A | Substrate B | A |
| 1-2 | " | " | B |
| 1-3 | " | " | C |
| 2-1 | " | Substrate C | A |
| 2-2 | " | " | B |
| 2-3 | " | " | C |
| 3-1 | " | Substrate D | A |
| 3-2 | " | " | B |
| 4-1 | " | Substrate E | A |
| 4-2 | " | " | B |

The above-prepared devices (Devices 1-1 to 4-2) were evaluated with respect to the following items, respectively.

1) Alignment state

An alignment state of liquid crystal molecules in a sample cell was observed through a polarizing microscope in cross-nicol condition to evaluate whether or not a uniaxial alignment state was uniformly obtained over the entire display region.

2) Electrical resistance of cell (cell resistance)

A cell resistance of a sample cell was determined based on a current passing across the cell under application of rectangular waveform (±5 V, 0.01 Hz) at 30° C.

More specifically, the current passing through the cell was obtained by electrically connecting a resistor for monitoring the current with the sample cell in series and measuring a potential difference between both ends of the resistor in the following manner.

A voltage (Va) of the rectangular waveform and a potential difference ($V_{MON}$) between both ends of the resistor are represented by the following equations, respectively:

$$Va = (R_{CELL} + R_{MON}) \times Ia,$$

$$V_{MON} = R_{MON} \times Ia,$$

where $R_{CELL}$ is a cell resistance; $R_{MON}$ is a resistance of the current-monitoring resistor; and Ia is a current passing through the sample cell.

From the above equations, the following equation is derived.

$$Va = (R_{CELL} + R_{MON}) \times (V_{MON}/R_{MON})$$

When the $R_{MON}$ is controlled to fulfill a relationship: $R_{CELL} \gg R_{MON}$, the Va equation is modified into the following one:

$$Va = (R_{CELL}/R_{MON}) \times V_{MON},$$

because of $(R_{CELL} + R_{MON}) \approx R_{CELL}$.

Accordingly, the cell resistance is obtained from the following equation:

$$R_{CELL} = (Va/V_{MON}) \times R_{MON}.$$

For measurement, the $R_{MON}$ (the resistance of the current-monitoring resistor) was appropriately controlled so as to satisfy the relationship: $R_{CELL} \gg R_{MON}$ depending on the sample cell used. The cell resistance was obtained as a resistance per unit area (1 cm×1 cm).

3) Inversion (switching) behavior

A sample cell was sandwiched between a pair of polarizers disposed in cross nicols and supplied with a bipolar pulse voltage (20 V, pulse width=30 $\mu$s) at room temperature to observe an optical response state by eyes. Specifically, the sample cell was placed in no voltage application state for 30 ms immediately after the pulse voltage application by causing short-circuit between electrodes of the pair of substrates of the cell. On condition that the period of 30 ms was taken as one-frame period, a switching state of liquid crystal molecules was observed in such a state that the pulse voltage was applied to the sample cell for one-frame period or several-frame period, as desired. The observation was performed from two viewpoints whether a molecular switching was effected depending on polarities (positive and negative) of the bipolar pulse and whether such switching was normally effected in one (or several)-frame period.

4) Drive margin parameter M2 (M2 margin)

A sample cell was sandwiched between a pair of polarizers disposed in cross nicols and driven by applying thereto driving waveforms (pulse voltages) as shown in FIG. 12 (Vop=20 V, 1/3.3 bias ratio, duty factor of 1/1000) to provide (write) a dark (blue) state and a bright (white) state while changing a pulse duration (application time) $\Delta t$ of the applied pulse.

Figure 13:
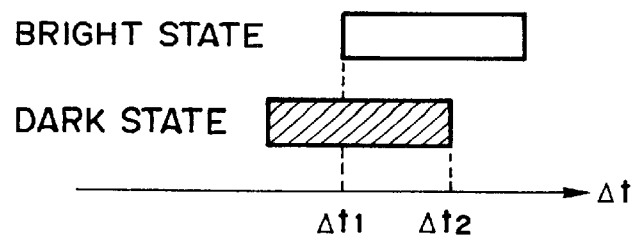
FIG. 13 is a schematic view of illustrating a drive margin (drive margin parameter M2).

In this instance, when a relationship between the duration $\Delta t$ ($\Delta t_1$, $\Delta t_2$) and display states (dark and bright) was as shown in FIG. 13, a drive margin parameter M2 (M2 margin) was obtained in accordance with the following equation:

$$\text{M2 margin} = (\Delta t_2 - \Delta t_1)/(\Delta t_2 + \Delta t_1)$$

Further, in order to evaluate the influence of a small DC offset voltage of a supply voltage, the sample cell was driven at 30° C. with a superposition of a DC voltage of on the order of −100 mV, ±0 mV or ±100 mV. At this time, an M2 margin was determined in a similar manner.

Incidentally, FIG. 13 is a schematic illustration for explaining the M2 margin. Specifically, a duration range ($\Delta t_2 - \Delta t_1$) corresponds to a range allowing a bright state (given by applying a voltage waveform ($S_N$–I) shown in FIG. 12 to a pixel concerned) and a dark state (given by applying a voltage waveform ($S_{N+1}$–I) shown in FIG. 12) at the same time while changing the duration $\Delta t$ at a fixed voltage Vop. Referring to FIG. 12, at $S_N$ is shown a selection scanning signal waveform applied to a selected scanning line for one-selection period (1H) as a pulse. The waveform $S_N$ is continuously applied while forming one period at a duty factor of 1/1000 against a non-selection period.

The results are shown in Table 4.

TABLE 4

| Device | Alignment[*1] | Cell resistance (ohm) | Inversion[*2] | M2 margin 10° C. | M2 margin 20° C. | M2 margin 30° C. | M2 margin (30°0 C., DC(mV)) -100 | M2 margin (30°0 C., DC(mV)) ±0 | M2 margin (30°0 C., DC(mV)) +100 |
|---|---|---|---|---|---|---|---|---|---|
| 1-1 | o | $2 \times 10^8$ | A | 0.10 | 0.18 | 0.25 | 0.05 | 0.25 | 0.05 |
| 1-2 | o | $2 \times 10^6$ | A | 0.20 | 0.24 | 0.27 | — | — | — |
| 1-3 | o | $2 \times 10^4$ | $B_1$ | — | — | — | — | — | — |
| 2-1 | o | $2 \times 10^8$ | A | 0.08 | 0.16 | 0.23 | 0.03 | 0.23 | 0.03 |
| 2-2 | o | $2 \times 10^6$ | A | 0.18 | 0.22 | 0.25 | — | — | — |
| 2-3 | o | $2 \times 10^4$ | $B_1$ | — | — | — | — | — | — |
| 3-1 | o | $5 \times 10^9$ | C | — | — | — | — | — | — |
| 3-2 | o | $5 \times 10^9$ | A | 0.18 | 0.22 | 0.25 | 0.25 | 0.25 | 0.25 |
| 4-1 | o | $5 \times 10^9$ | C | — | — | — | — | — | — |
| 4-2 | o | $5 \times 10^9$ | $B_2$ | 0.19 | 0.22 | 0.24 | — | — | — |

[*1] o represents a uniform alignment state free from or less alignment defect resulting from a deviation of the direction of a normal to a liquid crystal layer.
[*2] Evaluation standards are as follows.
A: Uniform inversion behavior free from inversion failure was observed.
$B_1$: Sufficient inversion behavior was not observed.
$B_2$: Inversion failure was somewhat observed (by eyes) but, as a result of microscopic observation, uniform inversion behavior free from inversion failure was observed at around the spacer beads although an inversion time becomes longer with an increase in distance from the spacer beads.
C: Inversion failure presumably caused by a reverse electric field phenomenon (inherent in the ferroelectric liquid crystal; as described in, e.g., JP-A 63-311231) was observed.

As is understood from the results of Table 4 (in combination with Tables 1–3), the devices 1-1 to 1-3, 2-1 to 2-3, 3-1 and 3-2, and 4-1 and 4-2 are evaluated as follows, respectively.

(Evaluation of Devices 1-1 to 1-3)
1) Alignment state

All the devices 1-1 to 1-3 were found to exhibit a good and equivalent alignment characteristic.

2) Cell resistance

The cell resistances (200 Mohm for Device 1-1, 2 Mohm for Device 1-2, and 20 kohm. for Device 1-3) were found to vary depending on the conductivity (resistivity) of the spacer used (at most $10^{-14}$ S/cm (Spacer A) for Device 1-1, $10^{-9}$ S/cm (Spacer B) for Device 1-2, and $10^{-4}$ S/cm (Spacer C) for Device 1-3).

In view of also the small thickness (5 nm) of the polyimide alignment layer used in all the devices, the alignment layer is expected to fail to function as an insulating layer or a high-resistance layer. Accordingly, the cell resistances are found to substantially corresponds to resistances (in the vertical direction) of the respective liquid crystal layers containing the respective spacer beads, respectively. Further, Device 1-1 employs Spacer A having a conductivity of at most $10^{-14}$ S/cm lower than that ($10^{-12}$ S/cm) of the liquid crystal material alone, so that the cell resistance (200 Mohm) of Device 1-1 is found to be attributable to the liquid crystal composition (FLC-1) per se. Accordingly, a layer structure consisting only of the composition (FLC-1) and otherwise identical to the liquid crystal layer of the sample cell used is found to show a resistance substantially close to 200 Mohm.

On the other hand, Devices 1-2 and 1-3 are found to provide a resistance of the liquid crystal layer containing the spacer member substantially lower than that (200 Mohm) of the above layer structure by using the electroconductive spacers (Spacers B and C), respectively.

Incidentally, the above-measured cell resistances were substantially not changed in a temperature range of 0–60° C.

3) Inversion behavior

It was found that Devices 1-1 and 1-2 exhibited a good switching characteristic compared with Device 1-3.

4) M2 margin

Device 1-2 was found to be particularly effective in improving an M2 margin at low temperatures (e.g., 10° C.) susceptible to the reverse electric field by reducing the resistance of the liquid crystal layer containing the spacer beads (Spacer B).

(Evaluation of Devices 2-1 to 2-3)
1) Alignment state

All the devices 2-1 to 2-3 were found to exhibit a good and equivalent alignment characteristic.

2) Cell resistance

The cell resistances (200 Mohm for Device 2-1, 2 Mohm for Device 2-2, and 20 kohm. for Device 2-3) were found to vary depending on the conductivity (resistivity) of the spacer used (at most $10^{-14}$ S/cm (Spacer A) for Device 2-1, $10^{-9}$ S/cm (Spacer B) for Device 2-2, and $10^{-4}$ S/cm (Spacer C) for Device 2-3).

In view of also the small thickness (5 nm) of the polyimide alignment layer used in all the devices, the alignment layer is expected to fail to function as an insulating layer or a high-resistance layer.

Similarly as in the case of Devices 1-1 to 1-3, Devices 2-2 and 2-3 are found to provide a resistance of the liquid crystal layer containing the spacer member substantially lower than that (200 Mohm) of a layer structure consisting only of the composition (FLC-1) by using the electroconductive spacers (Spacers B and C), respectively.

The devices resistances of Devices 2-1 to 2-3 were similar to those of Devices 1-1 to 1-3, respectively, although Substrate C used for Devices 2-1 to 2-3 provided a largely different sheet resistance ($10^{11}$ ohm/□) from that ($10^5$ ohm/□) given by Substrate B used for Devices 1-1 to 1-3.

This is presumably because the sheet resistances of the alignment layers (of Substrates B and C) can be negligible when compared with the resistances of the respective liquid crystal layer containing the silica beads due to a sufficiently small layer thickness (2000 Å) of the alignment layers.

Incidentally, the above-measured cell resistances were substantially not changed in a temperature range of 0–60° C.

3) Inversion behavior

It was found that Devices 2-1 and 2-2 exhibited a good switching characteristic compared with Device 2-3.

4) M2 margin

Device 2-2 was found to be particularly effective in improving an M2 margin at low temperatures (e.g., 10° C.) susceptible to the reverse electric field by reducing the resistance of the liquid crystal layer containing the spacer beads (Spacer B).

(Evaluation of Devices 3-1 and 3-2)
1) Alignment state

Both Devices 3-1 and 3-2 were found to exhibit a good and equivalent alignment characteristic.

2) Cell resistance

The cell resistances (5G ($5 \times 10^9$) ohm for Devices 3-1 and 3-2) were considerably larger than those (at most $2 \times 10^8$ ohm) of Devices 1-1 to 2-3 and were not affected by the kind of the spacer beads (Spacer A for Devices 3-1 and Spacer B for Device 3-2) different in electroconductivity. This is presumably because the TaOx layer of Substrate D used in both the devices fully functions as an insulating layer and thus the resistance of TaOx is reflected in the cell resistance. Accordingly, the dielectric layer (the polysiloxane layer and the TaOx layer) of Substrate D is found to substantially provide a resistance of on the order of 5 Gohm which is much larger than that of the liquid crystal layer. Further, in contrast with Device 3-1, Device 3-2 using Spacer B (electroconductive spacer) is found to substantially lower the resistance of the liquid crystal layer containing Spacer B similarly as in the case of Devices 1-2 and 2-2 each using Spacer B. Further, Device 3-2 provided a time constant T of $10^{-2}$ obtained by the product of the sheet resistance ($10^5$ ohm/□) and the total capacitance of the dielectric layers of Substrates A and D ($100 \times 10^{-9}$ F). Incidentally, the above-measured resistances were substantially not changed in a temperature range of 0–60° C.

3) Inversion behavior

It was found that Device 3-2 exhibited a good switching characteristic compared with Device 3-1.

4) M2 margin

Device 3-2 was found to be particularly effective in improving an M2 margin at low temperatures (e.g., 10° C.) susceptible to the reverse electric field by reducing the resistance of the liquid crystal layer containing the low-resistance spacer beads (Spacer B) even if it provided the cell resistance identical to that of Device 3-1.

Further, with respect to a change in the DC voltage (within ±100 mV), Device 3-2 set to have the resistance of the dielectric layer sufficiently larger than that of the liquid crystal layer and to have a decreased resistance of the liquid crystal layer per se by the use of the electroconductive spacer beads (Spacer B) is excellent in retaining a larger M2 margin when compared with Devices 1-1 and 2-1.

(Evaluation of Devices 4-1 and 4-2)
1) Alignment state

Both Devices 4-1 and 4-2 were found to exhibit a good and equivalent alignment characteristic.

2) Cell Resistance

Similarly as in the case of Devices 3-1 and 3-2, the TaOx layer of Substrate E used in both the devices is found to fully functions as an insulating layer, so that the resistance of TaOx is reflected in the cell resistance. Accordingly, the dielectric layer (the polysiloxane layer and the TaOx layer) of Substrate E is found to substantially provide a resistance of on the order of 5 Gohm which is much larger than that of the liquid crystal layer. Further, in contrast with Device 4-1, Device 4-2 using Spacer B (electroconductive spacer) is found to substantially lower the resistance of the liquid crystal layer containing Spacer B. Further, Device 4-2 provided a time constant T of $10^4$ obtained by the product of the sheet resistance ($10^{11}$ ohm/□) and the total capacitance of the dielectric layers of Substrates A and E ($100 \times 10^{-9}$ F). Incidentally, the above-measured resistances were substantially not changed in a temperature range of 0–60° C.

3) Inversion Behavior

Device 4-2 was found to provide a better inversion performance than Device 4-1 although the inversion time at a portion spaced from the spacer beads was increased presumably due to the influence of the reverse electric field. In Device 4-2, a normal inversion behavior was not observed until the writing operation was performed for a time corresponding to several-frame period. In order to remedy this deficiency, Device 4-2 is required to appropriately set a dispersion density of the spacer beads used.

4) M2 Margin

Device 4-2 was found to be particularly effective in improving an M2 margin at low temperatures (e.g., 10° C.) susceptible to the reverse electric field by reducing the resistance of the liquid crystal layer containing the low-resistance spacer beads (Spacer B).

EXAMPLE 2

A liquid crystal composition FLC-2 was prepared by mixing the following compounds in the indicated proportions, respectively, and showed a phase transition series (°C.), and an electrical conductivity $\sigma_{LC}$ shown below, respectively.

| Structural formula | wt. parts |
|---|---|
| $C_7H_{15}$—[pyrimidine]—[phenyl]—[phenyl]—$C_5H_{11}$ | 7 |
| $C_6H_{13}$—[pyrimidine]—[phenyl]—[phenyl]—$C_8H_{17}$ | 11 |
| $C_6H_{13}$—[phenyl]—[thiazole]—[phenyl]—$OCOC_6H_{13}$ | 4 |

-continued

| Structural formula | wt. parts |
|---|---|
| C₆H₁₃-benzothiazole-C₆H₄-OC₈H₁₇ | 4 |
| C₁₁H₂₃-pyrimidine-C₆H₄-OC(O)-thiophene-C₄H₉ | 9 |
| C₈H₁₇-indane-thiazole-C₆H₄-C₉H₁₉ | 6 |
| C₄H₉-benzoxazole-naphthalene-OC₁₀H₂₁ | 5 |
| C₁₂H₂₅-pyrimidine-C₆H₄-OC(O)-C₆H₄-F | 5 |
| C₁₁H₂₃-pyrimidine-C₆H₄-OC(O)-C₆H₃(F)-F | 2 |
| C₁₀H₂₁-pyrimidine-indane-C₈H₁₇ | 10 |
| C₁₁H₂₃-pyrimidine-indane-C₈H₁₇ | 7 |
| C₁₀H₂₁-pyrimidine-C₆H₄-OCH₂CHFC₈H₁₇ (*) | 10 |
| C₁₂H₂₅-pyrimidine-C₆H₄-OCH₂CHFC₆H₁₃ (*) | 5 |
| C₁₀H₂₁-pyrimidine-C₆H₄-O-C₆H₁₃ | 4 |

| Structural formula | wt. parts |
|---|---|
| 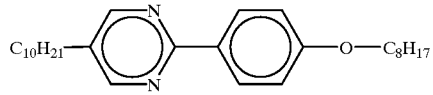 | 5 |
| 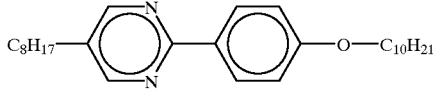 | 5 |
| 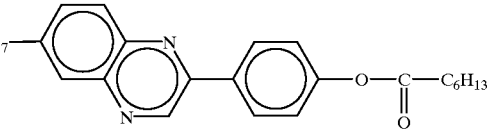 | 2 |
| 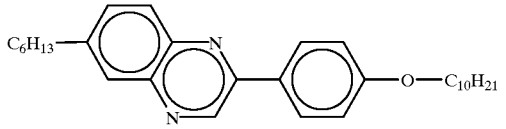 | 4 |

Phase transition (°C):

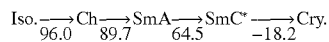

Ps (30° C.)=10.9 nC/cm$^2$ $\sigma_{LC}$ (30° C.)=10$^{-12}$ S/cm

Then, three substrates (Substrates F, G and H) were prepared in the following manner, respectively.

<Substrate F>

A 1.1 μm-thick glass substrate was coated with a ca. 150 nm-thick ITO film (transparent electrode) and further coated with a solution of a precursor of polyimide in NMP (N-methylpyrrolidone) ("LQ1802", mfd. by Hitachi Kasei Kogyo K.K.) by printing, followed by hot baking at 270° C. to form a 50 Å-thick alignment control layer, which was then rubbed with a acetate fiber-planted cloth to effect a uniaxial aligning treatment.

<Substrate G>

A 1.1 mm-thick glass substrate provided with a ca. 150 nm-thick ITO film (transparent electrode) was coated with a 10 wt. % (solid content)-solution of a ladder-type polysiloxane containing antimony-doped SnO$_2$ ultrafine particles (60 wt. %; particle size=100 Å) by spin coating, followed by pre-drying at 80° C. for 5 min. and hot baking at 200° C. for 1 hour to form a 2000 Å-thick polysiloxane alignment control layer. The polysiloxane alignment control layer coated with a precursor solution to a polyimide in NMP (N-methylpyrrolidone) ("LQ1802", mfd. by Hitachi Kasei Kogyo K.K.) by printing, followed by hot baking at 270° C. to form a 50 Å-thick polyimide alignment control layer, which was then rubbed with a acetate fiber-planted cloth to effect a uniaxial aligning treatment.

<Substrate H>

A 1.1 mm-thick glass substrate provided with a ca. 150 nm-thick ITO film (transparent electrode) was coated with a 70 nm-thick TaOx film by using a DC sputtering process under the following sputtering conditions.

Target: Tantalum pentoxide sintering target (purity=99.9%, mfd. by Mitsui Kinzoku K.K.)

Pressure: 3 mTorr

Ar/O$_2$: 150 sccm/50 sccm

Power: 2 kW

Then, the thus-treated glass substrate was further coated with a 10 wt. % (solid content)-solution of a ladder-type polysiloxane containing antimony-doped SnO$_2$ ultrafine particles (60 wt. %; particle size=100 Å) by spin coating, followed by pre-drying at 80° C. for 5 min. and hot baking at 200° C. for 1 hour to form a 2000 Å-thick polysiloxane alignment control layer. The polysiloxane alignment control layer coated with a precursor solution to a polyimide in NMP (N-methylpyrrolidone) ("LQ1802", mfd. by Hitachi Kasei Kogyo K.K.) by printing, followed by hot baking at 270° C. to form a 50 Å-thick polyimide alignment control layer, which was then rubbed with a acetate fiber-planted cloth to effect a uniaxial aligning treatment.

The thus-prepared substrates (Substrates F, G and H) were subjected to measurement of a sheet resistance $R_{sheet}$ and total capacitance $C_{total}$ (as a dielectric layer) in the manner shown below, whereby the following results (Table 5) were obtained.

TABLE 5

| Substrate | $R_{sheet}$ (ohm/□) | $C_{total}$ (nF) |
|---|---|---|
| F | at least 10$^{15}$ | 200 |
| G | 10$^5$ | 200 |
| H | 10$^5$ | 100 |

Then, by using appropriately selected two substrates from the above-prepared substrates, 7 blank cells were prepared by dispersing one species of spacer beads (Spacers D–F shown in Table 6 below) on one of the substrates at an average dispersion density of 300 particles/mm$^2$ and then applying the other substrate to the above one substrate so as to form an electrode matrix.

TABLE 6

| Spacer | Material | Average particle size ($\mu$m) | Conductivity (S/cm) |
|---|---|---|---|
| D | Silica beads | 1.1 | at most $10^{-14}$ |
| E | titanium oxide-coated silica beads | 1.1 | $10^{-9}$ |
| F | titanium oxide-coated silica beads | 1.1 | $10^{-4}$ |

Then, the above-prepared liquid crystal composition FLC-2 was filled in each of the above-prepared 7 blank cells under heating to prepare 7 liquid crystal cells (device) having structural members shown in Table 7.

TABLE 7

| Device | 1st substrate | 2nd substrate | Spacer |
|---|---|---|---|
| 5-1 | Substrate F | Substrate F | D |
| 5-2 | " | " | E |
| 5-3 | " | " | F |
| 6-1 | " | Substrate G | D |
| 6-2 | " | " | E |
| 7-1 | " | Substrate H | D |
| 7-2 | " | " | E |

The above-prepared devices (Devices 5-1 to 7-2) were evaluated in the same manner as in Example 1.
The results are shown in Table 8.

TABLE 8

| Device | Alignment*[1] | Cell resistance (ohm) | Inversion*[2] | M2 margin 10° C. | M2 margin 20° C. | M2 margin 30° C. | M2 margin (30°0 C., DC(mV)) −100 | ±0 | +100 |
|---|---|---|---|---|---|---|---|---|---|
| 5-1 | o | $1 \times 10^8$ | A | 0.13 | 0.21 | 0.28 | 0.08 | 0.28 | 0.08 |
| 5-2 | o | $2 \times 10^6$ | A | 0.23 | 0.27 | 0.30 | — | — | — |
| 5-3 | o | $2 \times 10^4$ | $B_1$ | — | — | — | — | — | — |
| 6-1 | o | $1 \times 10^8$ | A | 0.13 | 0.21 | 0.28 | 0.06 | 0.28 | 0.06 |
| 6-2 | o | $2 \times 10^6$ | A | 0.23 | 0.27 | 0.30 | — | — | — |
| 7-1 | o | $5 \times 10^9$ | C | — | — | — | — | — | — |
| 7-2 | o | $5 \times 10^9$ | A | 0.21 | 0.25 | 0.28 | 0.28 | 0.28 | 0.28 |

*[1]o represents a uniform alignment state free from or less alignment defect resulting from a deviation of the direction of a normal to a liquid crystal layer.
*[2]Evaluation standards are as follows.
A: Uniform inversion behavior free from inversion failure was observed.
$B_1$: Sufficient inversion behavior was not observed.
C: Inversion failure presumably caused by a reverse electric field phenomenon (inherent in the ferroelectric liquid crystal; as described in, e.g., JP-A 63-311231) was observed.

As is understood from the results of Table 8 (in combination with Tables 5–7), the devices 5-1 to 5-3, 6-1 and 6-2, and 7-1 and 7-2 are evaluated as follows, respectively.
(Evaluation of Devices 5-1 to 5-3)
1) Alignment State
All the devices 5-1 to 5-3 were found to exhibit a good and equivalent alignment characteristic.
2) Cell Resistance
The cell resistances (100 Mohm for Device 5-1, 2 Mohm for Device 5-2, and 20 kohm. for Device 5-3) were found to vary depending on the conductivity (resistivity) of the spacer used (at most $10^{-14}$ S/cm (Spacer D) for Device 5-1, $10^{-9}$ S/cm (Spacer E) for Device 5-2, and $10^{-4}$ S/cm (Spacer F) for Device 5-3).
In view of also the small thickness (50 Å) of the polyimide alignment layer used in all the devices, the alignment layer is expected to fail to function as an insulating layer or a high-resistance layer. Accordingly, the cell resistances are found to substantially corresponds to resistances (in the vertical direction) of the respective liquid crystal layers containing the respective spacer beads, respectively. Further, Device 5-1 employs Spacer D having a conductivity of at most $10^{-14}$ S/cm lower than that ($10^{-12}$ S/cm) of the liquid crystal material alone, so that the cell resistance (100 Mohm) of Device 5-1 is found to be attributable to the liquid crystal composition (FLC-2) per se. Accordingly, a layer structure consisting only of the composition (FLC-2) and otherwise identical to the liquid crystal layer of the sample cell used is found to show a resistance substantially close to 100 Mohm.
On the other hand, Devices 5-2 and 5-3 are found to provide a resistance of the liquid crystal layer containing the spacer member substantially lower than that (100 Mohm) of the above layer structure by using the electroconductive spacers (Spacers E and F), respectively.
Incidentally, the above-measured cell resistances were substantially not changed in a temperature range of 0–60° C.
3) Inversion Behavior
It was found that Devices 5-1 and 5-2 exhibited a good switching characteristic compared with Device 5-3.
4) M2 Margin
Device 5-2 was found to be particularly effective in improving an M2 margin at low temperatures (e.g., 10° C.) susceptible to the reverse electric field by reducing the resistance of the liquid crystal layer containing the spacer beads (Spacer E).
(Evaluation of Devices 6-1 and 6-2)
1) Alignment State
All the devices 6-1 and 6-3 were found to exhibit a good and equivalent alignment characteristic.
2) Cell Resistance
The cell resistances (100 Mohm for Device 6-1 and 2 Mohm for Device 6-2) were found to vary depending on the conductivity (resistivity) of the spacer used (at most $10^{-14}$ S/cm (Spacer D) for Device 6-1, and $10^{-9}$ S/cm (Spacer E) for Device 6-2).
In view of also the small thickness (50 Å) of the polyimide alignment layer used in all the devices, the polyimide alignment layer is expected to fail to function as an insulating layer or a high-resistance layer.
Similarly as in the case of Devices 5-1 to 5-3, Device 6-2 is found to provide a resistance of the liquid crystal layer containing the spacer member substantially lower than that (100 Mohm) of a layer structure consisting only of the composition (FLC-2) by using the electroconductive spacers (Spacer E), respectively.
The devices resistances of Devices 6-1 and 6-3 were similar to those of Devices 5-1 and 5-2, respectively, although Substrate G used for Devices 6-1 and 6-2 provided a largely different sheet resistance ($10^5$ ohm/□) from that (at least $10^5$ ohm/□) given by Substrate F used for Devices 5-1 and 5-2.

This is presumably because the sheet resistances of the alignment layers (of Substrates F and G) can be negligible when compared with the resistances of the respective liquid crystal layer containing the silica beads due to a sufficiently small layer thickness of the alignment layers.

Incidentally, the above-measured cell resistances were substantially not changed in a temperature range of 0–60° C.

3) Inversion behavior

It was found that Devices 6-1 and 6-2 exhibited a good switching characteristic.

4) M2 margin

Device 6-2 was found to be particularly effective in improving an M2 margin at low temperatures (e.g., 10° C.) susceptible to the reverse electric field by reducing the resistance of the liquid crystal layer containing the spacer beads (Spacer E).

(Evaluation of Devices 7-1 and 7-2)

1) Alignment State

Both Devices 7-1 and 7-2 were found to exhibit a good and equivalent alignment characteristic.

2) Cell Resistance

The cell resistances (5G ($5\times10^9$) ohm for Devices 7-1 and 7-2) were considerably larger than those (at most $1\times10^8$ ohm) of Devices 5-1 to 6-2. This is presumably because the TaOx layer of Substrate H used in Devices 7-1 and 7-2 fully functions as an insulating layer and thus the resistance of TaOx is reflected in the cell resistance. Accordingly, the dielectric layer (the polyimide layer, the polysiloxane layer and the TaOx layer) of Substrate H is found to substantially provide a resistance of on the order of 5 Gohm which is much larger than that of the liquid crystal layer. Further, in contrast with Device 7-1, Device 7-2 using Spacer E (electroconductive spacer) is found to substantially lower the resistance of the liquid crystal layer containing Spacer E similarly as in the case of Devices 5-2 and 6-2 each using Spacer E.

Incidentally, the above-measured resistances were substantially not changed in a temperature range of 0–60° C.

3) Inversion Behavior

It was found that Device 7-2 exhibited a good switching characteristic compared with Device 7-1.

4) M2 Margin

Device 7-2 was found to be particularly effective in improving an M2 margin at low temperatures (e.g., 10° C.) susceptible to the reverse electric field by reducing the resistance of the liquid crystal layer containing the low-resistance spacer beads (Spacer E) even if it provided the cell resistance identical to that of Device 7-1.

Further, with respect to a change in the DC voltage (within ±100 mV), Device 7-2 set to have the resistance of the dielectric layer sufficiently larger than that of the liquid crystal layer and to have a decreased resistance of the liquid crystal layer per se by the use of the electroconductive spacer beads (Spacer E) is excellent in retaining a larger M2 margin when compared with Devices 5-1 and 6-1.

As described hereinabove, according to the present invention, a liquid crystal device is designed such that a spacer member is appropriately selected to provide a liquid crystal layer containing the spacer member with an electric resistance substantially lower than an inherent electric resistance of a liquid crystal material (i.e., that of the liquid crystal layer alone containing no spacer member) and that prescribed several relationships between resistances and/or capacitances of the liquid crystal layer and a dielectric layer (comprising an alignment control layer and/or a passivation layer) are fulfilled. As a result, it becomes possible to lower or suppress a DC voltage component applied to the liquid crystal layer when the device is driven, thus preventing a deterioration of the liquid crystal material. Further, in the case of using a chiral smectic liquid crystal material (composition) having ferroelectricity, a deterioration in dive margin due to a reverse electric field occurring within the liquid crystal layer on the influence of a spontaneous polarization of the liquid crystal material is effectively suppressed.

What is claimed is:

1. A liquid crystal device, comprising:
    a pair of oppositely disposed substrates at least one of which is provided with a dielectric layer, and a liquid crystal layer disposed between the substrates and comprising a liquid crystal material and a spacer member dispersed therein, wherein
    the spacer member has an electrical conductivity larger than that of the liquid crystal material, and
    the liquid crystal layer as a whole has a resistance per unit area in a direction normal to the substrates in a prescribed temperature range substantially lower than that of the dielectric layer provided to at least one of the substrates.

2. A device according to claim 1, wherein the resistance of the liquid crystal layer as a whole is at most 1/10 of that of the dielectric layer in a prescribed temperature range.

3. A device according to claim 2, wherein the prescribed temperature range is 0–60° C.

4. A device according to claim 1, wherein the dielectric layer comprises at least an alignment control layer.

5. A device according to claim 4, wherein the alignment control layer has been subjected to a uniaxial aligning treatment.

6. A device according to claim 1, wherein the dielectric layer has a lamination structure including at least an alignment control layer and a passivation layer.

7. A device according to claim 6, wherein the alignment control layer comprises a film comprising a matrix and ultrafine particles dispersed therein optionally containing an electroconductivity-controlling impurity.

8. A device according to claim 6, wherein the passivation layer has a relative permittivity of at least 10.

9. A device according to claim 8, wherein the passivation layer comprises an organic insulating film.

10. A device according to claim 8, wherein the passivation layer comprises an inorganic insulating film.

11. A device according to claim 1, wherein the spacer member comprises particles having an electrical conductivity of at least $10^{-11}$ S/cm.

12. A device according to claim 11, wherein the spacer member comprises particles coated or doped with TiOx, SbOx or SnOx where x is an integer of 1–5.

13. A device according to claim 1, wherein the liquid crystal material comprises a chiral smectic liquid crystal.

14. A device according to claim 13, wherein the chiral smectic liquid crystal exhibits a ferroelectricity.

15. A liquid crystal device, comprising: a pair of oppositely disposed substrate at least one of which is provided with a dielectric layer, and a liquid crystal layer disposed between the substrates comprising a liquid crystal material and a spacer member dispersed therein, wherein
    the spacer member has an electrical conductivity of at least $10^{-11}$ S/cm and which is larger than that of the liquid crystal material, the liquid crystal layer as a whole has a first resistance in a direction of a normal to the substrates in a prescribed temperature range substantially lower than a second resistance of a corresponding liquid crystal layer, in the identical direction, consisting only of the liquid crystal material and having the identical plane area and thickness, and the liquid crystal layer as a whole has a third resistance per unit area in a direction of a normal to the substrates in a prescribed temperature range substantially lower than a fourth resistance per unit area of the dielectric layer provided to at least one of the substrates.

16. A liquid crystal device, comprising:

a pair of oppositely disposed substrates provided with a first dielectric layer and a second dielectric layer, respectively, and a liquid crystal layer disposed between the substrates and comprising a liquid crystal material and a spacer member dispersed therein, wherein the spacer member has an electrical conductivity larger than that of the liquid crystal material and comprises plural spacing constituents disposed at an average distance L from each other, and at least one of the following conditions 1 and 2 is satisfied in a prescribed temperature range:

(Condition 1) $R_{LC}<R_{V1}$ and $R_{H1}<R_{V1}$,
(Condition 2) $R_{LC}<R_{V2}$ and $R_{H2}<R_{V2}$,
wherein $R_{LC}$ represents a resistance per an area L×L of the liquid crystal layer as a whole in a direction of a normal to the substrates; $R_{V1}$ represents a resistance per an area L×L of the first dielectric layer in the normal direction; $R_{H1}$ represents a sheet resistance of the first dielectric layer in a horizontal direction to the substrates; $R_{V2}$ represents a resistance per an area L×L of the second dielectric layer in the normal direction; and $R_{H2}$ represents a sheet resistance of the second dielectric layer in the horizontal direction.

17. A device according to claim 16, wherein the prescribed temperature range is 0–60° C.

18. A device according to claim 16, wherein the resistance $R_{LC}$, $R_{V1}$, $R_{H1}$, $R_{V2}$ and $R_{H2}$ satisfy at least one of the following conditions 1a and 2a in a prescribed temperature range:

(Condition 1a) $10 \times R_{LC}<R_{V1}$ and $R_{H1}<R_{V1}$,
(Condition 2a) $10 \times R_{LC}<R_{V2}$ and $R_{H2}<R_{V2}$.

19. A device according to claim 17, wherein the prescribed temperature range is 0–60° C.

20. A device according to claim 16, wherein at least one of the first and second dielectric layers comprises at least an alignment control layer.

21. A device according to claim 20, wherein the alignment control layer has been subjected to a uniaxial aligning treatment.

22. A device according to claim 16, wherein at least one of the first and second dielectric layers has a lamination structure including at least an alignment control layer and a passivation layer.

23. A device according to claim 22, wherein the alignment control layer comprises a film comprising a matrix and ultrafine particles dispersed therein optionally containing an electroconductivity-controlling impurity.

24. A device according to claim 22, wherein the passivation layer has a relative permittivity of at least 10.

25. A device according to claim 24, wherein the passivation layer comprises an organic insulating film.

26. A device according to claim 24, wherein the passivation layer comprises an inorganic insulating film.

27. A device according to claim 16, wherein the spacer member comprises particles.

28. A device according to claim 27, wherein the spacer member comprises particles coated or doped with TiOx, SbOx or SnOx where x is an integer of 1–5.

29. A device according to claim 16, wherein the liquid crystal material comprises a chiral smectic liquid crystal.

30. A device according to claim 29, wherein the chiral smectic liquid crystal exhibits a ferroelectricity.

31. A liquid crystal device, comprising:

a pair of oppositely disposed substrates each provided with an alignment control layer and a liquid crystal layer disposed between the substrates and comprising a liquid crystal material and a spacer member dispersed therein, at least one of the substrates being provided with an electrode, a passivation layer and the alignment control layer disposed thereon in this order, wherein the spacer member has an electrical conductivity larger than that of the liquid crystal material and comprises plural spacing constituents disposed at an average distance L from each other, and the following condition 3 is satisfied in a prescribed temperature range:

(Condition 3) $R_{LC}<R_{V3}$ and $R_{H3}<R_{V3}$,
wherein $R_{LC}$ represents a resistance per an area L×L of the liquid crystal layer as a whole member in a direction of a normal to the substrates; $R_{V3}$ represents a resistance per an area L×L of the alignment control layer and the passivation layer as a whole in the normal direction; $R_{H3}$ represents a sheet resistance of the alignment control layer and the passivation layer as a whole in a horizontal direction to the substrate.

32. A device according to claim 31, wherein the prescribed temperature range is 0–60° C.

33. A device according to claim 31, wherein the resistance $R_{LC}$, $R_{V3}$, and $R_{H3}$ satisfy the following condition 3a in a prescribed temperature range:

(Condition 3a) $10 \times R_{LC}<R_{V3}$ and $R_{H3}<R_{V3}$.

34. A device according to claim 33, wherein the prescribed temperature range is 0–60° C.

35. A device according to claim 31, wherein at least one of the alignment control layers has been subjected to a uniaxial aligning treatment.

36. A device according to claim 31, wherein at least one of the alignment control layers disposed on the passivation layer comprises a film comprising a matrix and ultrafine particles dispersed therein optionally containing an electroconductivity-controlling impurity.

37. A device according to claim 31, wherein the passivation layer has a relative permittivity of at least 10.

38. A device according to claim 37, wherein the passivation layer comprises an organic insulating film.

39. A device according to claim 37, wherein the passivation layer comprises an inorganic insulating film.

40. A device according to claim 31, wherein the spacer member comprises particles having an electrical conductivity of at least $10^{-11}$ S/cm.

41. A device according to claim 40, wherein the spacer member comprises particles coated or doped with TiOx, SbOx or SnOx where x is an integer of 1–5.

42. A device according to claim 31, wherein the liquid crystal material comprises a chiral smectic liquid crystal.

43. A device according to claim 42, wherein the chiral smectic liquid crystal exhibits a ferroelectricity.

44. A liquid crystal device, comprising:

a pair of oppositely disposed substrates provided with at least a first dielectric layer and a second dielectric layer, respectively, and a liquid crystal layer dispersed between the substrates and comprising a liquid crystal material and a spacer member disperesed therein, wherein the spacer member has an electrical conductivity larger than that of the liquid crystal material and comprises plural spacing constituents disposed at an average distance L from each other, and at least one of the following conditions 4 and 5 is satisfied in a prescribed temperature range:

(Condition 4) $R_{LC}<R_{V1}$, $R_{H1}<R_{V1}$, and $C \times R_{H1} \leq T$ (T=1 sec), (Condition 5) $R_{LC}<R_{V2}$, $R_{H2}<R_{V2}$, and $C \times R_{H2} \leq T$ (T=1 sec), wherein $R_{LC}$ represents a resistance per an area L×L of the liquid crystal layer as a whole in a direction of a normal to the substrates; $R_{V1}$ represents a resistance per an area L×L of the first dielectric layer in the normal direction; $R_{H1}$ represents a sheet resistance of the first dielectric layer in a horizontal direction to the substrates; $R_{V2}$ represents a resistance per an area L×L of the second dielectric layer in the normal direction; $R_{H2}$ represents a sheet resistance of the second dielectric layer in the horizontal direction; and C represents a total capacitance per an area L×L of the first and second dielectric layers.

45. A device according to claim 44, wherein the prescribed temperature range is 0–60° C.

46. A device according to claim 44, wherein the resistance $R_{LC}$, $R_{V1}$, $R_{H1}$, $R_{V2}$ and $R_{H2}$ and the capacitance C satisfy at least one of the following conditions 4a and 5a in a prescribed temperature range:

(Condition 4a) $10 \times R_{LC} < R_{V1}$, $R_{H1} < R_{V1}$, and $C \times R_{H1} \leq T$ (T=1 sec), (Condition 5a) $10 \times R_{LC} < R_{V2}$, $R_{H2} < R_{V2}$, and $C \times R_{H2} \leq T$ (T=1 sec).

47. A device according to claim 44, wherein the prescribed temperature range is 0–60° C.

48. A device according to claim 44, wherein at least one of the first and second dielectric layers comprises at least an alignment control layer.

49. A device according to claim 48, wherein the alignment control layer has been subjected to a uniaxial aligning treatment.

50. A device according to claim 44, wherein at least one of the first and second dielectric layers has a lamination structure including at least an alignment control layer and a passivation layer.

51. A device according to claim 50, wherein the alignment control layer comprises a film comprising a matrix and ultrafine particles dispersed therein optionally containing an electroconductivity-controlling impurity.

52. A device according to claim 50, wherein the passivation layer has a relative permittivity of at least 10.

53. A device according to claim 52, wherein the passivation layer comprises an organic insulating film.

54. A device according to claim 52, wherein the passivation layer comprises an inorganic insulating film.

55. A device according to claim 44, wherein the spacer member comprises particles having an electrical conductivity of at least $10^{-11}$ S/cm.

56. A device according to claim 55, wherein the spacer member comprises particles coated or doped with TiOx, SbOx or SnOx where x is an integer of 1–5.

57. A device according to claim 44, wherein the liquid crystal material comprises a chiral smectic liquid crystal.

58. A device according to claim 57, wherein the chiral smectic liquid crystal exhibits a ferroelectricity.

59. A liquid crystal device, comprising: a pair of oppositely disposed substrates each provided with an alignment control layer and a liquid crystal layer disposed between the substrates comprising a liquid crystal material and a spacer member dispersed therein, at least one of the substrates being provided with an electrode, a passivation layer and the alignment control layer disposed thereon in this order, wherein the spacer member has an electrical conductivity larger than that of the liquid crystal material and comprises plural spacing constituents disposed at an average distance L from each other, and the following condition 6 is satisfied in a prescribed temperature range:

(Condition 6) $R_{LC}<R_{V3}$, $R_{H3}<R_{V3}$, and $C \times R_{H3} \leq T$ (T=1 sec), wherein $R_{LC}$ represents a resistance per an area L×L of the liquid crystal layer as a whole in a direction of a normal to the substrates; $R_{V3}$ represents a resistance per an area L×L of the alignment control layer and the passivation layer as a whole in the normal direction; $R_{H3}$ represents a sheet resistance of the alignment control layer and the passivation layer as a whole in a horizontal direction to the substrates; and C represents a total capacitance per an area L×L of the alignment control layer and the passivation layer as a whole.

60. A device according to claim 59, wherein the prescribed temperature range is 0–60° C.

61. A device according to claim 59, wherein the resistance $R_{LC}$, $R_{V3}$, and $R_{H3}$ and the capacitance C satisfy the following condition 6a in a prescribed temperature range:

(Condition 6a) $10 \times R_{LC} < R_{V3}$, $R_{H3} < R_{V3}$, and $C \times R_{H3} \leq T$ (T=1 sec).

62. A device according to claim 61, wherein the prescribed temperature range is 0–60° C.

63. A device according to claim 59, wherein at least one of the alignment control layers has been subjected to a uniaxial aligning treatment.

64. A device according to claim 59, wherein at least one of the alignment control layers disposed on the passivation layer comprises a film comprising a matrix and ultrafine particles dispersed therein optionally containing an electroconductivity-controlling impurity.

65. A device according to claim 59, wherein the passivation layer has a relative permittivity of at least 10.

66. A device according to claim 65, wherein the passivation layer comprises an organic insulating film.

67. A device according to claim 65, wherein the passivation layer comprises an inorganic insulating film.

68. A device according to claim 59, wherein the spacer member comprises particles having an electrical conductivity of at least $10^{-11}$ S/cm.

69. A device according to claim 68, wherein the spacer member comprises particles coated or doped with TiOx, SbOx or SnOx where x is an integer of 1–5.

70. A device according to claim 59, wherein the liquid crystal material comprises a chiral smectic liquid crystal.

71. A device according to claim 70, wherein the chiral smectic liquid crystal exhibits a ferroelectricity.

72. A liquid crystal apparatus, comprising: a liquid crystal device according to any one of claims 1, 15, 16, 31, 44 and 59; and a drive means for driving the liquid crystal device.

73. A liquid crystal apparatus, comprising: a liquid crystal device according to claim 44 or 59; and a drive means for driving the liquid crystal device in a line-or-dot sequential scanning scheme wherein one frame-forming period $T_F$ satisfies the following relationship: $T \leq T_F$.

* * * * *

UNITED STATES PATENT AND TRADEMARK OFFICE
CERTIFICATE OF CORRECTION

PATENT NO.   : 6,122,031
DATED        : September 19, 2000
INVENTOR(S)  : Masahiro Terada et al.

It is certified that error appears in the above-identified patent and that said Letters Patent is hereby corrected as shown below:

<u>Title page,</u>
Item [56], FOREIGN PATENT DOCUMENTS "04272982" should read -- 4-272982 --
References Cited, OTHER DOCUMENTS
Insert:   --      OTHER DOCUMENTS
          M. Schadt and W. Helfrich, Voltage-Dependent Optical
              Activity of a Twisted Nematic Liquid Crystal, APL,
              vol. 18, no. 4, pps. 127-128. --

<u>Column 1,</u>
Line 23, "thus" should read -- and thus --;
Line 24, "being going" should read -- is expected --;
Line 44, "in,Japanese" should read -- in Japanese --;
Line 55, "an the" should read -- and the --.

<u>Column 2,</u>
Line 14, "as less" should read -- as little --;
Line 36, "in case" should read -- in the case --.

<u>Column 3,</u>
Line 3, "while keeping" should read -- keeps --;
Line 24, "provide" should read -- provided --;
Line 61, "embodiments" should read -- embodiment --;
Line 62, "invention;" should read -- invention, --.

<u>Column 5,</u>
Line 6, "<RV$_3$" should read -- <R$_{v3}$ --.

<u>Column 6,</u>
Line 16, "<RV$_3$," should read -- <R$_{v3}$, -- and "CxRH$_3$" should read -- CXR$_{H3}$ --

<u>Column 7,</u>
Line 41, "reducing" should read -- reduce --.

UNITED STATES PATENT AND TRADEMARK OFFICE
CERTIFICATE OF CORRECTION

PATENT NO. : 6,122,031
DATED : September 19, 2000
INVENTOR(S) : Masahiro Terada et al.

It is certified that error appears in the above-identified patent and that said Letters Patent is hereby corrected as shown below:

Column 8,
Line 4, "characteristic," should read -- characteristics, --;
Line 5, "those that of" should read -- those of --;
Line 17, "prevent" should read -- present --;
Line 26, "(vertical" should read -- (vertical) --;
Line 36, "preferable" should read -- preferably --;
Line 61, "though" should read -- through --.

Column 9,
Line 56, "In case" should read -- In a case --.

Column 10,
Line 11, "suppressing" should read -- suppress --;
Line 11, "minimiz" should read -- minimize --;
Line 12, "ing" should be deleted;
Line 30, "In case" should read -- In the case --;
Line 37, "In case" should read -- In the case --.

Column 11,
Line 20, "in case" should read -- in the case --;
Line 23, "in case" should read -- in the case --;
Line 32, "the a pair" should read -- a pair --;
Line 35, "two-type" should read -- two types --;
Line 52, "provides" should read -- provide --.

Column 12,
Line 20, "In case" should read -- In the case --;
Line 55, "an diffusion" should read -- a diffusion --.

Column 13,
Line 38, "in case" should read -- in the case --;
Line 58, "In case" should read -- In the case --.

Column 19,
Line 62, "substrate" should read -- substrates --.

UNITED STATES PATENT AND TRADEMARK OFFICE
CERTIFICATE OF CORRECTION

PATENT NO. : 6,122,031
DATED : September 19, 2000
INVENTOR(S) : Masahiro Terada et al.

It is certified that error appears in the above-identified patent and that said Letters Patent is hereby corrected as shown below:

Column 21,
Line 38, "may" should read -- may be --;
Line 42, "such a" should read -- such as --.

Column 22,
Line 1, "case" should read -- the case --.

Column 23,
Line 34, "-CH≡N-," should read -- —CH=N-, --;
Line 38, "—CH$_{31}$, " should read -- —CH$_3$, --;
Line 43, "—CH$_2$)$_r$—, " should read -- —CH$_2$)$_{ra}$—, --.

Column 24,
Line 48, "—C$_{rc}$H$_{2r}$— , " should read -- C$_{rc}$H$_{2rc}$—, --.

Column 25,
Line 7, "though" should read -- through --.

Column 26,
Line 10, "V$_1$/(V$_1$+V$_s$)1/3." should read --V$_1$(V$_1$+V$_s$)=1/3.--.

Column 29,
Line 19, "the shown" should read -- the formula shown --;
Line 62, "content)solution" should read -- content) solution --.

Column 30,
Line 60, "(1 cmx lcm)" should read -- (1 cm x 1 cm) --.

Column 32,
Line 3 "R$_{MON}$) ≈ R$_{CELL}$" should read -- R$_{MON}$ ≑ R$_{CELL}$ --;
Line 13, "(1 cmx 1 cm)" should read -- (1 cm x 1 cm) --;
Line 28, "viewpoints" should read -- viewpoints: --;
Line 65, "1/1000against" should read -- 1/1000 against --.

UNITED STATES PATENT AND TRADEMARK OFFICE
CERTIFICATE OF CORRECTION

PATENT NO.   : 6,122,031
DATED        : September 19, 2000
INVENTOR(S)  : Masahiro Terada et al.

It is certified that error appears in the above-identified patent and that said Letters Patent is hereby corrected as shown below:

Column 33,
Line 43, "corresponds" should read -- correspond --.

Column 34,
Table 4, "(30°0C., DC (mV))" should read -- (30°C., DC (mV)) --;
Line 34, "$10^{-14}$" not boldface";
Line 34, "$10^{-9}$" not boldface";
Line 35, "$10^{-4}$" not boldface;
Line 47, "devices" should read -- device --;
Line 50, " ($10^{-11}$" not boldface and " ($10^{5}$" not boldface".

Column 35,
Line 9, "Devices" should read -- Device --.

Column 36,
Line 8, "functions" should read -- function --;
Line 29, "several-frame period" should read -- several frame periods --.

Column 39,
Line 45, "with a" should read -- with an --;
Line 60, "with a" should read -- with an --.

Column 40,
Line 45, "with a" should read -- with an --.

Column 42,
Table 8, "(30°0C., DC (mV))" should read -- (30°C., DC (mV)) --;
Line 2, "corresponds" should read -- correspond --;
Line 66, "devices" should read -- device --.

UNITED STATES PATENT AND TRADEMARK OFFICE
CERTIFICATE OF CORRECTION

PATENT NO.    : 6,122,031
DATED         : September 19, 2000
INVENTOR(S)   : Masahiro Terada et al.

It is certified that error appears in the above-identified patent and that said Letters Patent is hereby corrected as shown below:

Column 44,
Line 7, "dive" should read -- drive --;
Line 60, "comprising: a pair" should read -- comprising: ¶ a pair --;
Line 61, "substrate" should read -- substrates --.

Column 47,
Line 10, "$R_{v1}$, $R_{H1}$" should read -- $R_{V1}$ and $R_{H1}$ --;
Line 35, "claim 44," should read -- claim 46, --.

Signed and Sealed this

Thirtieth Day of July, 2002

Attest:

Attesting Officer

JAMES E. ROGAN
Director of the United States Patent and Trademark Office